US012657631B2

(12) United States Patent
Durvasula et al.

(10) Patent No.: US 12,657,631 B2
(45) Date of Patent: Jun. 16, 2026

(54) SYSTEMS AND METHODS FOR ARTIFICIAL INTELLIGENCE-BLOCKCHAIN RETIREMENT ACCOUNT MANAGEMENT

(71) Applicant: TEACHERS INSURANCE AND ANNUITY ASSOCIATION OF AMERICA, New York, NY (US)

(72) Inventors: Sastry Vsm Durvasula, Phoenix, AZ (US); Swatee Singh, Livingston, NJ (US); Rares Ioan Almasan, Paradise Valley, AZ (US); Sonam Jha, Short Hills, NJ (US)

(73) Assignee: TEACHERS INSURANCE AND ANNUITY ASSOCIATION OF AMERICA, New York, NY (US)

( * ) Notice: Subject to any disclaimer, the term of this patent is extended or adjusted under 35 U.S.C. 154(b) by 0 days.

(21) Appl. No.: 18/761,057

(22) Filed: Jul. 1, 2024

(65) Prior Publication Data

US 2026/0004353 A1     Jan. 1, 2026

(51) Int. Cl.
G06Q 40/06        (2012.01)
G06Q 10/04        (2023.01)
G06Q 20/40        (2012.01)

(52) U.S. Cl.
CPC ............. G06Q 40/06 (2013.01); G06Q 10/04 (2013.01); G06Q 20/401 (2013.01)

(58) Field of Classification Search
CPC ............. G06Q 10/04; G06Q 10/06334; G06Q 10/0843; G06Q 20/401; G06Q 30/0202;
(Continued)

(56) References Cited

U.S. PATENT DOCUMENTS

2015/0066811 A1*   3/2015  Legare ................... G06Q 40/06
                                                      705/36 R
2018/0300408 A1*  10/2018  Kavuri ................ G06F 16/2471
                          (Continued)

FOREIGN PATENT DOCUMENTS

CN           109064151 A  * 12/2018  ............. G06Q 20/10
WO     WO-2023200007 A1 * 10/2023   ............. G06Q 40/06

OTHER PUBLICATIONS

Dock, "Decentralized Identifiers (DIDs): The Ultimate Beginner's Guide 2023". Dec. 8, 2023. Retrieved from the Internet at :< https://www.dock.io/post/decentralized-identifiers>.
(Continued)

*Primary Examiner* — Wodajo Getachew
(74) *Attorney, Agent, or Firm* — MARSHALL, GERSTEIN & BORUN LLP

(57)        ABSTRACT

The methods disclosed herein relate to managing, discovering, and performing transactions on retirement accounts using artificial intelligence and/or blockchain. In one embodiment, a method includes retrieving account data for retirement accounts associated with third-party financial institutions, retrieving external financial data, providing the account data to a trained capture model to cause the trained capture model to generate structured account data, providing the structured account data, the external financial data, and user data associated with the user to a trained deep learning forecast model to cause the trained deep learning forecast model to generate a forecast, and outputting the forecast to the user.

7 Claims, 20 Drawing Sheets

(58) Field of Classification Search
CPC .... G06Q 40/033; G06Q 40/042; G06Q 40/06;
G06Q 40/063; G06Q 40/0631
USPC .......................................................... 705/75
See application file for complete search history.

(56) References Cited

U.S. PATENT DOCUMENTS

| | | | | |
|---|---|---|---|---|
| 2021/0297403 A1* | 9/2021 | Lee | ..................... | H04L 63/0876 |
| 2023/0040330 A1* | 2/2023 | Torrenegra | ......... | G06Q 10/1053 |
| 2025/0225584 A1* | 7/2025 | Wellmann | ........ | G06Q 10/06375 |

OTHER PUBLICATIONS

Windley, Phil, "Decentralized Identifiers". Mar. 13, 2019. Retrieved from the Internet at: <https://medium.com/@windley/decentralized-identifiers-fb34c50bf880>.

Metadium, "Decentralized Identifiers: Personal Information and Claims, the easy guide". Jul. 11, 2019. Retrieved from the Internet at: <https://medium.com/metadium/decentralized-identifiers-personal-information-and-claims-the-easy-guide-ee58b5427dd2>.

Metadium, "Decentralized Identifiers: Verifiable Credentials and Presentations, the easy guide". Jul. 18, 2019. Retrieved from the Internet at: <https://medium.com/metadium/decentralized-identifiers-verifiable-credentials-and-presentations-the-easy-guide-4397ac2a4b3e>.

Metadium, "Decentralized Identifiers: the easy guide". Jul. 4, 2019. Retrieved from the Internet at: <https://medium.com/metadium/decentralized-identifiers-the-easy-guide-fb96429e8b24>.

Buchanan, Bill, "Providing a Number is in a Given Range Without Revealing the Number: Meet Bulletproofs". Apr. 21, 2022. Retrieved from the Internet at :<https://medium.com/asecuritysite-when-bob-met-alice/proving-a-number-is-in-a-given-range-without-realing-the-number-meet-bulletproofs-cdcf1c3fd . . . >.

Buchanan, Bill, "Rust and Bulletproofs . . . Towards a More Trusted and Private Digital World". Nov. 14, 2021. Retrieved from the Internet at: <https://medium.com/asecuritysite-when-bob-met-alice/rust-and-bulletproofs-towards-a-more-trusted-and-private-digital-world-6120dd721390 >.

Nopara73, "Confidential Transactions/Bulletproofs". Apr. 22, 2020. Retrieved from the Internet at :< https://medium.com/@nopara73/confidential-transactions-bulletproofs-117bf1db186e >.

Buchanan, Bill, "The Magic of Bulletproofs". Jun. 3, 2019. Retrieved from the Internet at: < https://medium.com/@billatnapier/the-magic-of-bulletproofs-961b6c006a4f >.

Rodriguez, Jesus, "Bulletproofs: The New Kid in Blockchain Security Land". Oct. 18, 2018. Retrieved from the Internet at: < https://medium.com/hackernoon/bulletproofs-the-new-kid-in-blockchain-security-land-e730fc0efe14 >.

Creighton, Rhett, "Cheeseburger: Zclassic on Mimblewimble". Mar. 22, 2023. Retrieved from the Internet at: < https://medium.com/@rhettcreighton/cheeseburger-zclassic-on-mimblewimble-5fcdac0dfa52 >.

Sunflower Corporation, "What are Confidential Transactions?". Aug. 5, 2022. Retrieved from the Internet at: < https://medium.com/coinmonks/what-are-confidential-transactions-63d48bd20772 >.

Evan.Network Wiki, "Contract & Content Encryption". Retrieved from the Internet at: <https://evannetwork.github.io/docs/how_it_works/services.html#:~:text=This profile itself is encrypted the keys are shared with.>.

Hindi, Rand, "Private Smart Contracts Using Homomorphic Encryption". May 23, 2023. Retrieved from the Internet at: <https://www.zama.ai/post/private-smart-contracts-using-homomorphic-encryption >.

Solidity Academy, "Data Privacy and Homomorphic Encryption in Solidity: Safeguarding Confidentiality in Smart Contracts". Jun. 21. Retrieved from the Internet at: < https://medium.com/@solidity101/data-privacy-and-homomorphic-encryption-in-solidity-safeguarding-confidentiality-in-smart-a6f2b313b33f >.

Paillier, Pascal, "5 ways in which FHE can solve blockchain's privacy problems". Sep. 4, 2023. Retrieved from the Internet at: < https://www.helpnetsecurity.com/2023/09/04/fully-homomorphic-encryption-fhe/ >.

Panther Academy, "Bulletproofs In Crypto—An introduction to a Non-Interactive ZKP". Sep. 16, 2022. Retrieved from the Internet at: < https://blog.pantherprotocol.io/bulletproofs-in-crypto-an-introduction-to-a-non-interactive-zk-proof/ >.

Gora Network, "Verifiable Credentials will change how we present our ID". Nov. 14, 2023. Retrieved from the Internet at: < https://medium.com/@goranetwork/verifiable-credentials-will-change-how-we-present-our-id-ddae4de80bfd >.

Yun, Cathie, "Building on Bulletproofs". Apr. 12, 2019. Retrieved from the Internet at: < https://medium.com/@cathieyun/building-on-bulletproofs-2faa58af0ba8 >.

Soares, Guilherme, "Day 56: Bulletproofs: Slimming Down Confidential Transactions". Nov. 25, 2023. Retrieved from the Internet at: < https://medium.com/@gsoares-block/day-56-bulletproofs-slimming-down-confidential-transactions-6015b15bc4a5 >.

Hourani, Mustafa, "Explaining the Recent Rise of Fully Homomorphic Encryption in the Blockchain Industry". Oct. 10, 2023. Retrieved from the Internet at: < https://medium.com/@mustafa.hourani/explaining-the-recent-rise-of-fully-homomorphic-encryption-in-the-blockchain-industry-c7081fa05458>.

Behnke, Rob, "Fully Homomorphic Encryption (FHE) and the Blockchain". Nov. 27, 2023. Retrieved from the Internet at: < https://www.halborn.com/blog/post/fully-homomorphic-encryption-fhe-and-the-blockchain >.

Samani, Kyle, "The Dawn of On-Chain FHE". Sep. 26, 2023. Retrieved from the Internet at: < https://multicoin.capital/2023/09/26/the-dawn-of-on-chain-fhe/ >.

Copeland, Tim, "What is a Mimblewimble blockchain?". Sep. 13, 2023. Retrieved from the Internet at: < https://www.theblock.co/learn/249519/what-is-a-mimblewimble-blockchain >.

Tarilabs, "Mimblewimble Transactions Explained". Dec. 12, 2023. Retrieved from the Internet at: < https://tlu.tarilabs.com/protocols/mimblewimble-transactions-explained >.

Vitáris, Benjamin, "What is Mimblewimble? Guide For Dummies". Aug. 9, 2020. Retrieved from the Internet at: < https://cryptopotato.com/what-is-mimblewimble-the-complete-beginners-guide/ >.

Taiko Labs, "Introduction to FHE: What is FHE, how does FHE work, how is it connected to ZK and MPC, what are the FHE use cases in and outside of the blockchain, etc.". Nov. 23, 2023. Retrieved from the Internet at: < https://taiko.mirror.xyz/209rJeB-1PalQeYQIZkn4vgRNr_PgzaO8TWUOM5wf3M >.

Chillotti, Ilaria, "TFHE Deep Dive—Part I—Ciphertext types". May 4, 2022. Retrieved from the Internet at: < https://www.zama.ai/post/tfhe-deep-dive-part-1#:~:text=All the dots will connect,look at this blog post. >.

Joye, Marc, "Homomorphic Encryption 101". Dec. 1, 2021. Retrieved from the Internet at: < https://www.zama.ai/post/homomorphic-encryption-101 >.

* cited by examiner

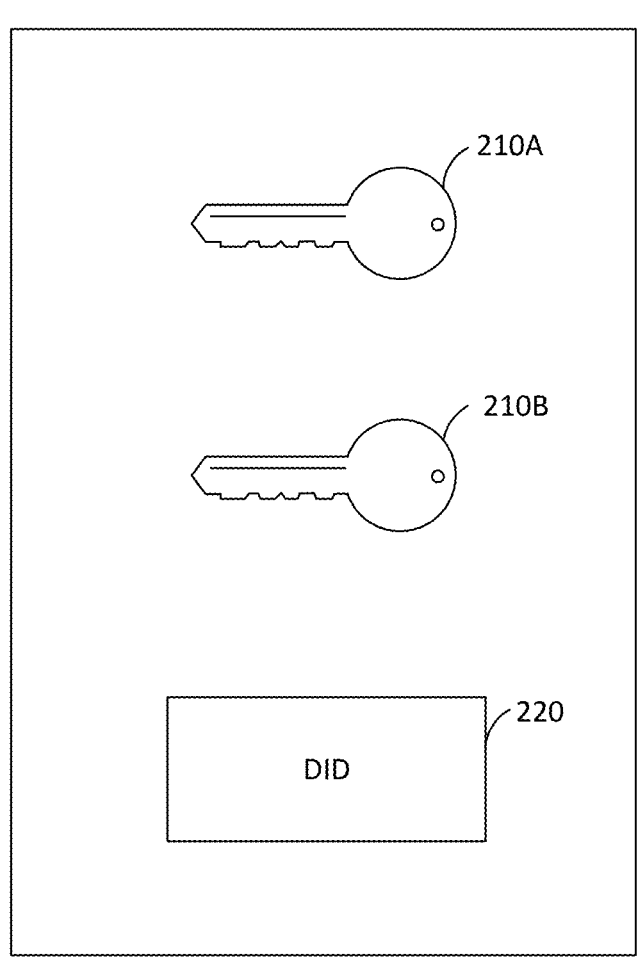
FIG. 2

124

| | |
|---|---|
| Smart Hub App ⌐310 | Authentication Module ⌐320 |
| Scraper Module ⌐330 | Chatbot Module ⌐340 |
| Distributed Ledger Manager Module ⌐350 | Zero Knowledge Proof Module ⌐360 |
| Oracle Module ⌐370 | Smart Contract Manager Module ⌐380 |
| Machine Learning Module ⌐390<br>Machine Learning Training Module ⌐392<br>Machine Learning Operation Module ⌐394 | Account Discovery Module ⌐396 |

| Example Account Data 412 | Example Plan Requirements 414 | Example Summaries 416 | Presentation Style Information 418 |
Training Data
410
Machine Learning Module
390
Account Data
430
Plan Requirements
432
Chatbot
340
420
Capture Model
Structured Account Data
440
Structured Plan Requirements
442
Account Data Summary
444
Plan Reqs. Summary
446
FIG. 4

500

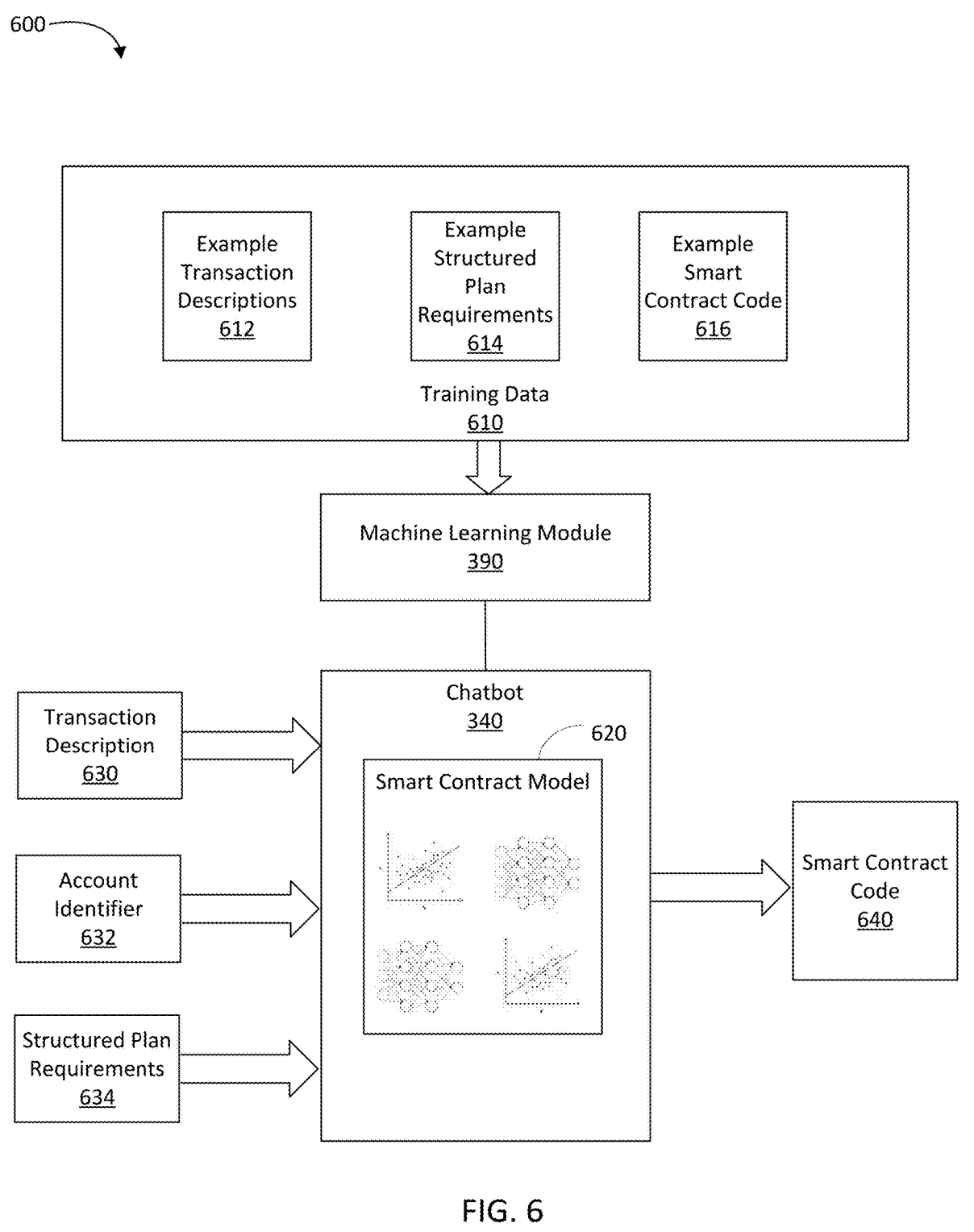

600

Training Data
610

Example Transaction Descriptions 612

Example Structured Plan Requirements 614

Example Smart Contract Code 616

Machine Learning Module
390

Transaction Description
630

Account Identifier
632

Structured Plan Requirements
634

Chatbot
340

620

Smart Contract Model

Smart Contract Code
640

FIG. 6

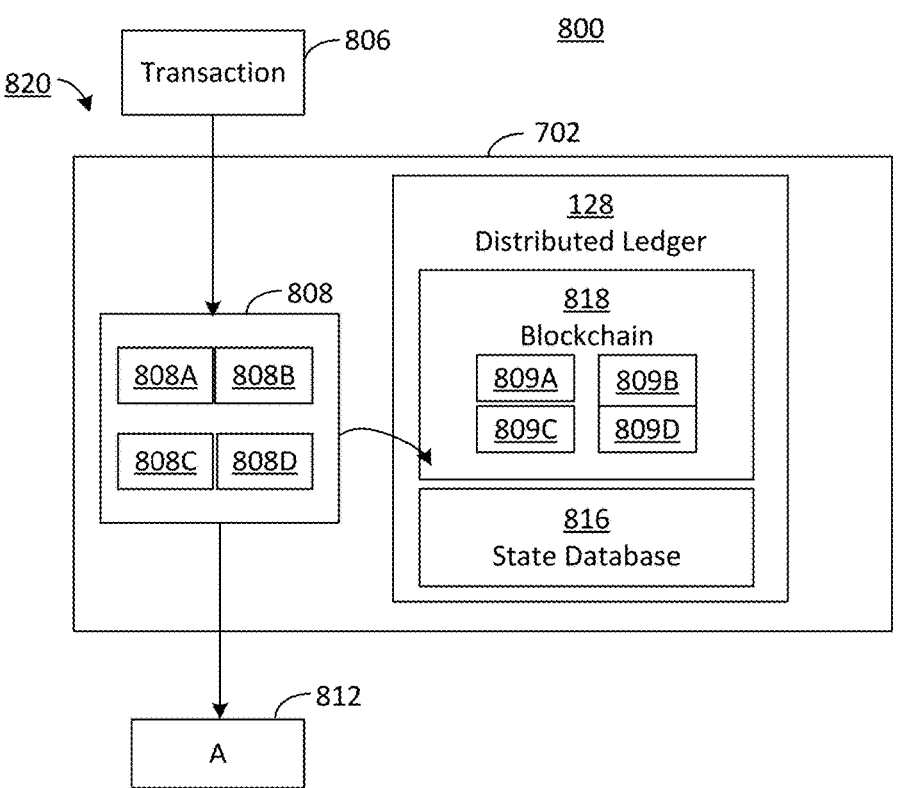
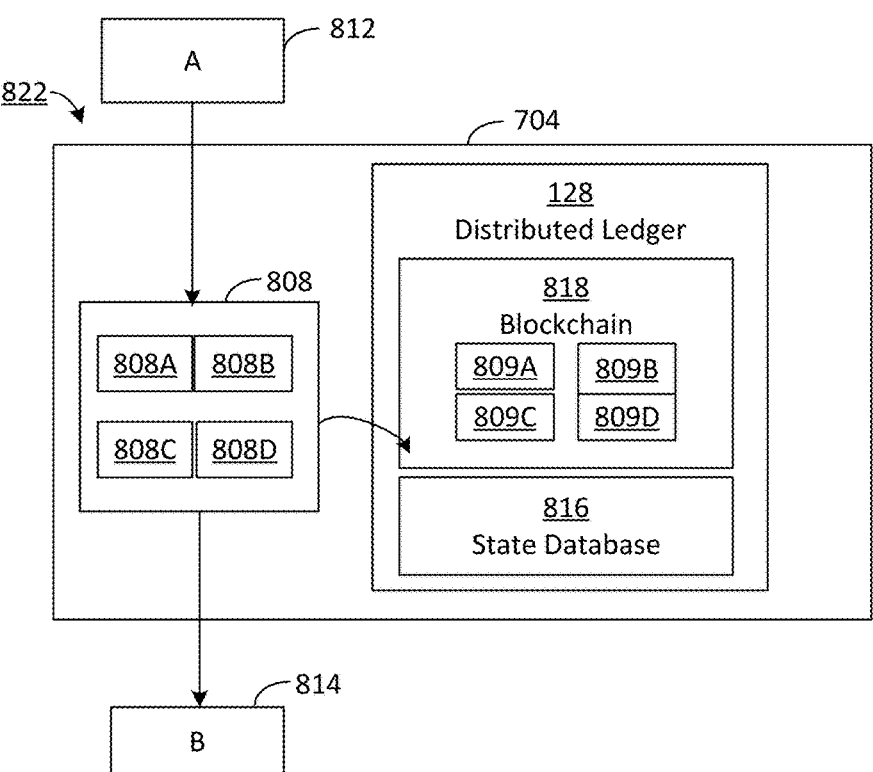
FIG. 8

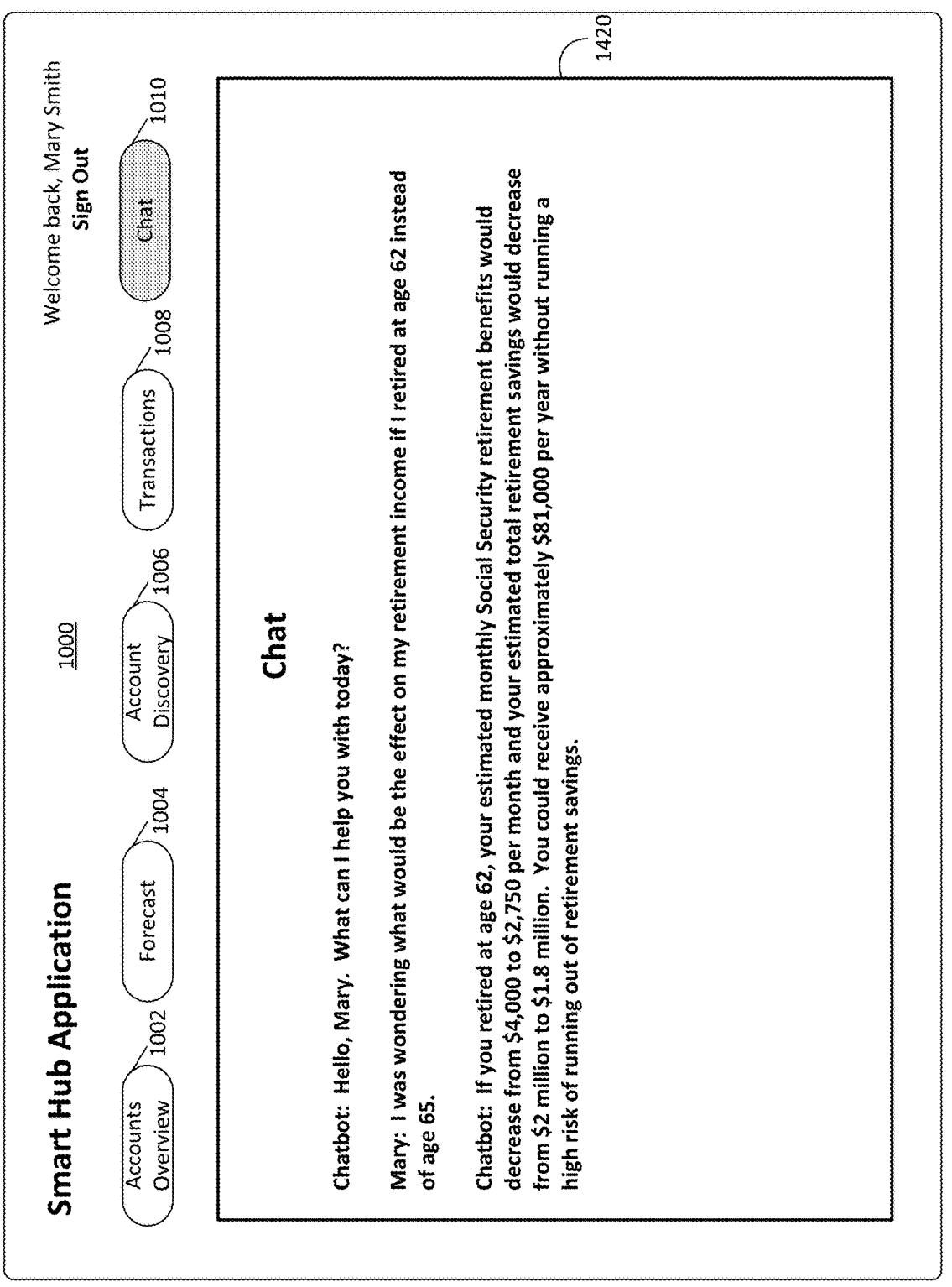

Smart Hub Application    1000

Welcome back, Mary Smith
Sign Out

Accounts Overview 1002    Forecast 1004    Account Discovery 1006    Transactions 1008    Chat 1010

Chat

Chatbot: Hello, Mary. What can I help you with today?

Mary: I was wondering what would be the effect on my retirement income if I retired at age 62 instead of age 65.

Chatbot: If you retired at age 62, your estimated monthly Social Security retirement benefits would decrease from $4,000 to $2,750 per month and your estimated total retirement savings would decrease from $2 million to $1.8 million. You could receive approximately $81,000 per year without running a high risk of running out of retirement savings.

1510
Retrieve Account Data for Retirement Accounts

1520
Retrieve External Financial Data

1530
Provide Account Data to Capture Model to Generate Structured Account Data

1540
Provide Structured Account Data, External Financial Data, and User Data to Forecast Model to Generate Forecast 1550
Output Forecast to User

1600

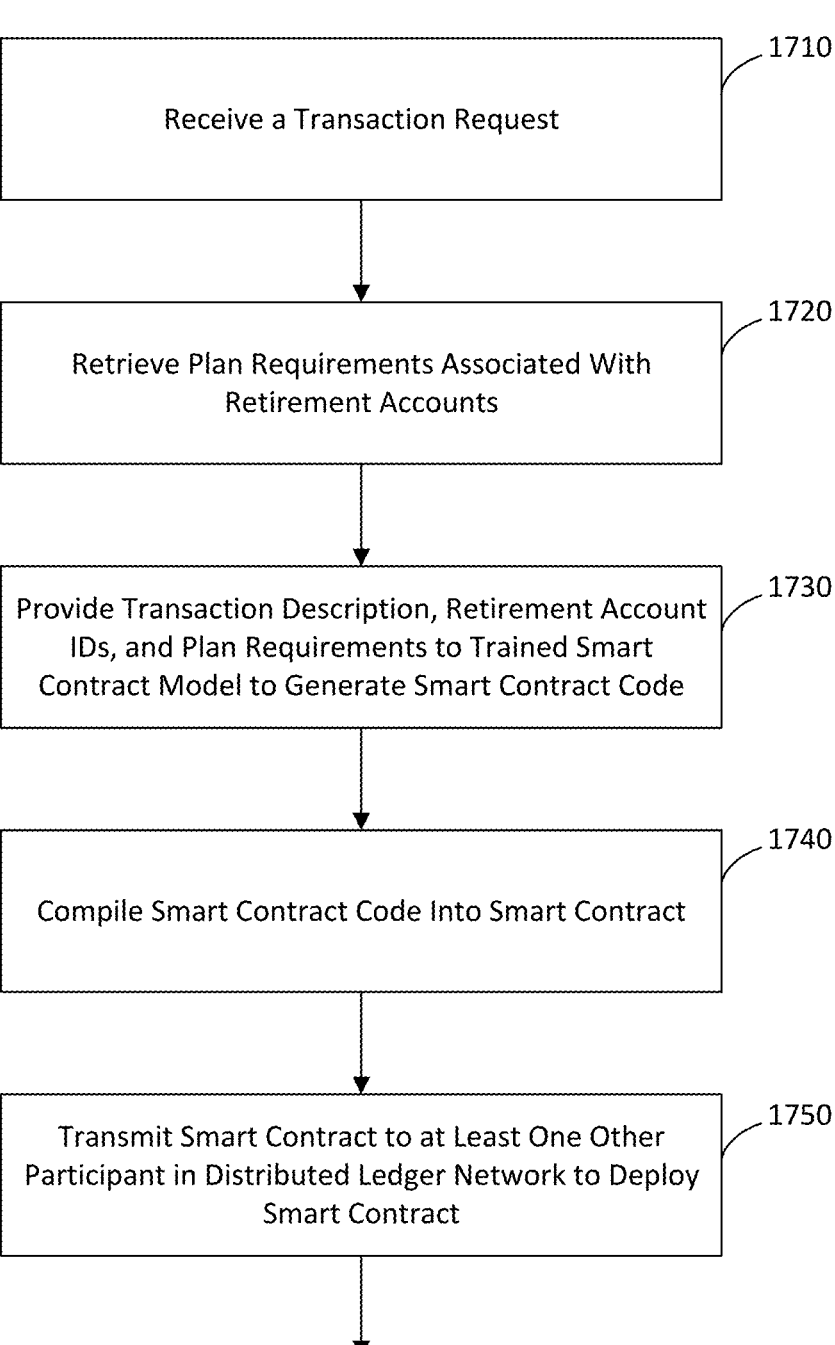

1700

1710
Receive a Transaction Request

1720
Retrieve Plan Requirements Associated With Retirement Accounts

1730
Provide Transaction Description, Retirement Account IDs, and Plan Requirements to Trained Smart Contract Model to Generate Smart Contract Code 1740
Compile Smart Contract Code Into Smart Contract 1750
Transmit Smart Contract to at Least One Other Participant in Distributed Ledger Network to Deploy Smart Contract

SYSTEMS AND METHODS FOR ARTIFICIAL INTELLIGENCE-BLOCKCHAIN RETIREMENT ACCOUNT MANAGEMENT

TECHNICAL FIELD

The present disclosure is generally directed to methods and systems for secure, transparent, and intelligent management of retirement accounts.

BACKGROUND

Fraud and scams are a major problem in the retirement industry. Through phishing e-mails and text messages appearing to be originating from a retirement account provider, millions of dollars per year are scammed out of retirement accounts. Lack of security in the retirement system causes a decline of trust among retirement account holders.

Tracking multiple retirement and/or pension accounts is difficult. Due to having multiple employers throughout their careers, participants often lose track of their accounts. Even when the participants are aware of all accounts, managing multiple accounts and having a holistic assessment of the participants' retirement outlook is challenging.

SUMMARY

Artificial intelligence and/or distributed ledgers may be used to provide a centralized hub for retirement participants to view and manage a plurality of retirement accounts across a plurality of financial institutions.

In an exemplary embodiment, a computer-implemented method for managing one or more retirement accounts for a user includes (1) retrieving account data for the one or more retirement accounts associated with one or more third-party financial institutions; (2) retrieving external financial data from one or more external data sources; (3) providing the account data to a trained capture model to cause the trained capture model to generate structured account data; (4) providing the structured account data, the external financial data, and user data associated with the user to a trained deep learning forecast model to cause the trained deep learning forecast model to generate a forecast, wherein the forecast comprises a prediction of a total balance of the one or more retirement accounts over time; and/or (5) outputting the forecast to the user. The method may include additional, less, or alternate functionality or actions, including those discussed elsewhere herein.

In an exemplary embodiment, a computer-implemented method for discovering lost retirement accounts for a user includes (1) receiving from a user authentication credentials comprising data encrypted by a private key associated with the user; (2) authenticating the user by decrypting the data by a public key associated with the private key; (3) receiving from the user a request to discover the lost retirement accounts; (4) retrieving identification data associated with the user; (5) supplying the identification data to a plurality of third-party financial institutions to cause the plurality of third-party financial institutions to search for retirement accounts associated with the identification data; and/or (6) responsive to receiving notification of the one or more retirement accounts associated with the identification data, (a) providing one or more links to one or more of the plurality of third-party financial institutions associated with the one or more retirement accounts to enable the user to reset third-party authentication credentials, (b) receiving an account identifier and the third-party authentication credentials for the one or more retirement accounts, and/or (c) saving the account identifier and the third-party authentication credentials. The method may include additional, less, or alternate functionality or actions, including those discussed elsewhere herein.

In an exemplary embodiment, a computer-implemented method for performing retirement account transactions on a distributed ledger includes (1) receiving from a user a transaction request comprising a transaction description and one or more retirement account identifiers associated with one or more retirement accounts; (2) retrieving plan requirements associated with the one or more retirement accounts, wherein the plan requirements comprise financial institution rules or government regulations; (3) providing the transaction description, the one or more retirement account identifiers, and the plan requirements to a trained smart contract model to cause the trained smart contract model to generate smart contract code, wherein the smart contract code comprises programmatic logic for executing the transaction request; (4) compiling the smart contract code into a smart contract, wherein the smart contract is configured to (a) receive one or more transaction inputs associated with the transaction request, (b) execute the transaction request using the one or more transaction inputs, and/or (c) generate one or more transaction outputs; (5) transmitting the smart contract to at least one other participant in a distributed ledger network to deploy the smart contract, wherein the smart contract is stored in a distributed ledger maintained by a network of participants; (6) sending the one or more transaction inputs to the smart contract; (7) receiving the one or more transaction outputs from the smart contract; and/or (8) providing to the user a transaction summary comprising information about the one or more transaction inputs and the one or more transaction outputs. The method may include additional, less, or alternate functionality or actions, including those discussed elsewhere herein.

The disclosed systems and methods include improvements in computer functionality at least because the language models and deep learning models may be trained and/or fine-tuned with additional data and/or user feedback and thus may learn and improve their generation capabilities over time.

In addition, disclosed systems and methods improve computer security by implementing cryptographic authentication of users. That is, security may be improved by using distributed identifiers and/or other authentication credentials encrypted by a private key associated with a user and/or client device instead of traditionally providing a username and password for authentication.

In addition, the present disclosure includes specific features other than what is well-understood, routine, conventional activity in the field, or adding unconventional steps that confine the claim to a particular useful application, e.g., centralized management of retirement accounts affiliated with third-party financial institutions, as further described herein.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Additional, alternate and/or fewer actions, steps, features and/or functionality may be included in an aspect and/or embodiments, including those described elsewhere herein. Accordingly, the drawings and description are to be regarded as illustrative in nature and not as restrictive.

A distributed ledger is a mechanism for decentralized storage of data, events, transactions, etc. that is maintained by several participants. In particular, a distributed ledger achieves a distributed consensus on the validity or invalidity of information recorded in the distributed ledger. Instead of relying on a central authority or centralized storage, a distributed ledger is a decentralized database in which a transactional record of changes to the ledger is maintained and validated by each node of a peer-to-peer network. Thus, the distributed ledger provides a decentralized trust to participants and observers. One type of distributed ledger, a blockchain, comprises transactions grouped together into "blocks," and ordered sequentially (thus the term "blockchain"). While the distributed ledgers discussed herein are referred to in the context of a blockchain, this is merely one example of a distributed ledger. Distributed ledgers may also include a tangle, a block lattice, or other directed acyclic graph (DAG). Nodes may join and leave the blockchain network over time and may obtain blocks from peer nodes that were propagated while the node was gone. Nodes may maintain addresses of other nodes and exchange addresses of known nodes with one another to facilitate the propagation of new information across the network in a decentralized, peer-to-peer manner.

The nodes that share the distributed ledger form what is referred to herein as the distributed ledger network. The nodes in the distributed ledger network validate changes to the blockchain (i.e., when a new transaction and/or block is created) according to a set of consensus rules. The consensus rules depend on the information being tracked by the blockchain and may include rules regarding the blockchain itself. For example, a consensus rule may require that the originator of a change supply a proof-of-identity such that only approved entities may originate changes to the blockchain. A consensus rule may require that blocks and transactions adhere to format requirements and supply certain metadata regarding the change (e.g., blocks must be below a size limit, transactions must include a number of fields, etc.). A consensus rule may include a mechanism for determining the order in which new blocks are added to the chain (e.g., through a proof-of-work system, proof-of-stake, etc.).

Additions to the blockchain that satisfy the consensus rules are propagated from nodes that have validated the addition to other known nodes. If all the nodes that receive a change to the blockchain validate the new block, then the distributed ledger reflects the new change as stored on all nodes, and it may be said that distributed consensus has been reached with respect to the new block and the information contained therein. Any change that does not satisfy the consensus rule is disregarded by validating nodes that receive the change and the change is not propagated to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable.

The validation activities of nodes applying consensus rules on a blockchain network may take various forms. In one implementation, the blockchain may be viewed as a shared spreadsheet that tracks data such as the ownership of assets. In another implementation, the validating nodes execute code contained in "smart contracts," and distributed consensus is expressed as the network nodes agreeing on the output of the executed code.

A smart contract is a computer protocol that enables the automatic execution and/or enforcement of an agreement between different parties. In particular, the smart contract may be computer code that is located at a particular address on the blockchain. In some cases, the smart contract may run automatically in response to a participant in the blockchain sending funds (e.g., a cryptocurrency such as bitcoin, ether, or other digital/virtual currency) to the address where the smart contract is stored. Additionally, smart contracts may maintain a balance of the amount of funds that are stored at the blockchain's address. In some scenarios when this balance reaches zero, the smart contract may no longer be operational.

The smart contract may include one or more trigger conditions, that, when satisfied, correspond to one or more actions. For some smart contracts, the action(s) performed may be determined based upon one or more decision conditions. In some instances, data streams may be routed to the smart contract so that the smart contract may detect that a trigger condition has occurred and/or analyze a decision condition.

Blockchains may be deployed in a public, decentralized, and permissionless manner meaning that any party may view the distributed ledger, submit new information to be added to the ledger, or join the network as a validating node. Other blockchains are private (e.g., permissioned ledgers) that keep chain data private among a group of entities authorized to participate in the blockchain network. Other blockchain implementations may be both permissioned and permissionless whereby participants may need to be validated, but only the information that participants in the network wish to be public is made public.

In some implementations, a distributed ledger includes multiple blockchains such as a main blockchain and several side chains operating independently of the main blockchain. The side chains then interact with the main blockchain to provide some of the transaction data from the side chains to the main blockchain. In this manner, the side chains can be private while the main blockchain is public or available to a larger number of entities than the side chains. Non-sensitive information from the side chains may be shared on the main blockchain. Also in some implementations, a distributed ledger includes multiple layers or separate blockchains executing in parallel that are maintained by the same validating nodes. Some of the transaction data from the blockchain for the first layer may be provided to the blockchain for the second layer or vice versa.

In one example, a distributed ledger may be maintained by validating nodes that transmit data to remote systems using one or more public and/or private networks, such as a private enterprise network, the Internet, a cellular router, a backhaul Internet, or other type of backhaul connection. The validating nodes receive transactions broadcasted to the distributed ledger network. The validating nodes then validate the broadcasted transactions. In some implementations, the storage centers are validating nodes such that the storage centers validate broadcasted transactions.

BRIEF DESCRIPTION OF THE DRAWINGS

FIG. 2 illustrates a block diagram of a digital wallet in accordance with an example aspect of the present disclosure;

FIGS. 4-6 illustrate training and operation of exemplary machine learning environments in accordance with example aspects of the present disclosure;

FIG. 8 illustrates exemplary validating network nodes and an exemplary transaction flow on a distributed ledger network in a decentralized file storage system in accordance with an example aspect of the present disclosure;

FIGS. 10-14 illustrate an exemplary smart hub application user interface in accordance with an example aspect of the present disclosure;

FIGS. 17A and 17B illustrate a flow diagram representing an exemplary method for performing transactions on retirement accounts using a distributed ledger in accordance with an example aspect of the present disclosure.

DETAILED DESCRIPTION

Figure 1:
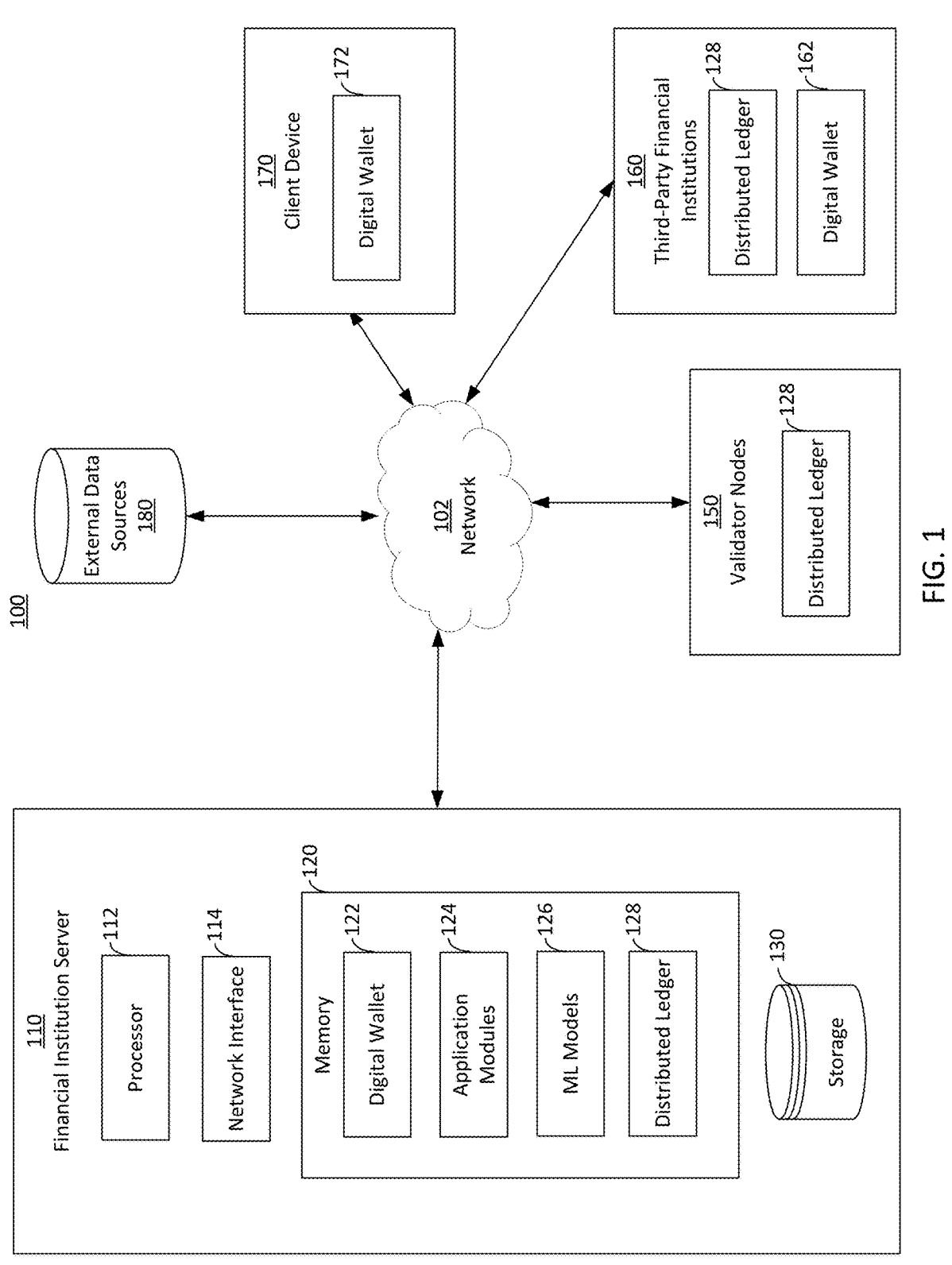
FIG. 1 illustrates a block diagram of a retirement account management computing system in accordance with an example aspect of the present disclosure.

FIG. 1 illustrates various aspects of an example retirement account management computing system 100. The retirement account management computing system 100 may include one or more financial institution servers 110, validator nodes 150, third-party financial institutions 160, client devices 170, and external data sources 180, which may be communicatively connected through a network 102 as described below. One or more components of the retirement account management computing system 100 may be provided by virtual instances (e.g., one or more cloud-based virtualization services).

The financial institution server 110 may be associated with (e.g., owned/operated by) a company that sells and/or provides financial products and/or services. The financial institution server 110 may be an individual server, a group (e.g., cluster) of multiple servers, or another suitable type of computing device or system (e.g., a collection of cloud computing resources).

The financial institution server 110 may include one or more processors 112. The processor 112 may include any suitable number of processors and/or processor types, such as one or more central processing units (CPUs) and/or one or more graphics processing units (GPUs). Generally, the processor 112 is configured to execute software instructions stored in a memory 120.

The financial institution server 110 may further include a network interface 114, such as wired/wireless controllers (e.g., Ethernet controllers). The network interface 114 facilitates communication over the network 102 between the financial institution server 110 and other components of the retirement account management computing system 100.

The memory 120 may include one or more persistent memories (e.g., read only memory (ROM), a hard drive, solid state memory, etc.) and one or more transitory memories (e.g., a random access memory (RAM) and/or cache). The memory 120 may include an operating system, one or more software applications, one or more software modules, and/or one or more machine learning (ML) models. The operating system includes any suitable operating system, such as Microsoft Windows, Linux, or UNIX.

The memory 120 may store a digital wallet 122. The memory 120 may store one or more sets of computer executable software application modules 124. The application modules 124 may be implemented in any programming language, e.g., Python, C, C++, HTML, JavaScript, etc. The application modules 124 may be implemented as compiled executables and libraries and/or interpretable source code.

The memory 120 may include one or more machine learning (ML) models 126. The memory 120 may include data such as a copy of a distributed ledger 128, user profiles, application data for the applications and modules, and/or other data necessary to interact with the other components of the retirement account management computing system 100 through the network 102.

The financial institution server 110 may also include storage 130. The storage 130 may be used to store data and/or documents, such as account data, authentication data, and/or any other suitable data. The storage 130 may include a relational database, such as Oracle, DB2, MySQL, a NoSQL-based database, such as MongoDB, or another suitable database. The storage 130 may include a decentralized file storage system, such as the InterPlanetary File System (IPFS), Filecoin, a combination of these, or any other suitable decentralized file storage system.

According to embodiments, the validator nodes 150 and third-party financial institution nodes 160 may be a combination of hardware and software components. The third-party financial institution nodes 160 may be owned and/or operated by one or more financial institutions, such as banks, brokerage firms, retirement account providers, etc. The financial institution server 110, validator nodes 150, and/or third-party financial institution nodes 160 may validate changes to the distributed ledger 128 (e.g., when a new transaction and/or block is created) according to a set of consensus rules.

The financial institution server 110, validator nodes 150, and/or third-party financial institution nodes 160 may append distributed ledger data to the distributed ledger 128 if the distributed ledger data satisfies the consensus rules by generating a new block of validated transactions to include in the distributed ledger 128 and/or by broadcasting a block of transactions to other network nodes. Otherwise, financial institution server 110, validator nodes 150, and/or third-party financial institution nodes 160 disregard any distributed ledger data that does not satisfy the consensus rules, and the distributed ledger data is not propagated to other network nodes. The third-party financial institution nodes may include a digital wallet 162.

The client device 170 may include, by way of example, a tablet computer, a personal digital assistant (PDA), a mobile device smartphone also referred to herein as a "mobile device," a laptop computer, a desktop computer, a portable media player, a wearable computing device, a virtual reality headset, smart glasses, a smart watch, a phablet, another smart device, a device configured for wired or wireless RF (Radio Frequency), etc. Of course, any network-enabled device appropriately configured may interact with the retirement account management computing system 100. The client device 170 may communicate with the network 102 via wired or wireless signals and, in some instances, may communicate with the network 102 via an intervening wireless or wired device, which may be a wireless router, a wireless repeater, a base transceiver station of a mobile telephony provider, an optical communications device, etc. The client device 170 may be owned and/or operated by a financial institution account holder. The client device 170 may include a digital wallet 172.

The client device 170 may include one or more processors, a memory, and other components not shown in FIG. 1 (e.g., a display, a communication unit, a user-input device, etc.), all of which may be interconnected via an address/data bus. The memory may include an operating system, a data storage, a plurality of software applications, and/or a plurality of software routines. The operating system, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

According to embodiments, the external data sources 180 may be a combination of hardware and software components. The external data sources 180 may include government agencies, legal databases, news sites, financial market data sources, etc. The external data sources 180 may include public and/or private data sources. The external data sources 180 may provide data, such as financial market data or the text of regulations, to the financial institution server 110 and other network nodes. The external data sources 180 may provide the data via HTTP, HTTPS, a standardized or proprietary API, or any other suitable protocol.

The financial institution server 110, validator nodes 150, third-party financial institution nodes 160, client device 170, and external data sources 180 may communicate with each other via the network 102. The network 102 may be a proprietary network, a public Internet, a virtual private network, and/or some other type of network, such as dedicated access lines, plain ordinary telephone lines, satellite links, a wireless telephony network, combinations of these, etc. Where the network 102 comprises the Internet, data communication may take place over the network 102 via an Internet communication protocol.

The financial institution server 110 and the third-party financial institution nodes 160 may communicate with each other over the network 102 in a secure manner using a virtual private network (VPN). The VPN may use a symmetric encryption scheme, such as advanced encryption standard (AES), to encrypt and decrypt sensitive data. The financial institution server 110 may store and use a different symmetric encryption key with each of the third-party financial institution nodes 160 to establish VPN tunnels with each of the third-party financial institution nodes 160. The symmetric encryption keys may be exchanged in a secure manner, such as using Diffie-Hellman key exchange and/or quantum cryptography, to ensure the symmetric keys are not modified or intercepted in transit.

FIG. 2 depicts an exemplary digital wallet 200, such as digital wallet 122, digital wallet 162, and digital wallet 172. The digital wallet 200 refers to an electronic account controlled by an owner that enables the owner to perform transactions, such as send, retrieve, and/or store digital assets. Examples of digital assets include currency (e.g., cryptocurrency and/or non-cryptocurrency), NFTs, etc. The digital wallet 200 stores, for each digital asset, information regarding the location of the digital asset on the distributed ledger 128. The digital wallet 200 may include a private key 210A and a public key 210B. The private key 210A may be a secret key that the user or organization creates, which corresponds to the public key 210B, wherein the public key 210B is for public dissemination and the private key 210A is held strictly in confidence—i.e., is accessible only by the owner/controller of the digital wallet 200. The private key 210A is used to digitally sign transactions. For example, when a transaction is initiated, the digital wallet 200 can create a digital signature by processing the transaction with the private key 210A. The digital wallet 200 can be identified by the public key 210B. The public key 210B defines an address for the digital wallet 200 that others can use to send digital assets to the digital wallet 200. In this way, the owner that controls the digital wallet 200 exercises self-sovereignty of its identity, because it is exercising control over authentication and encryption of its private information rather than relying on a third party to control its private keys (e.g., as would be the case if the private key was stored by a third party and/or if symmetric key encryption was used).

The digital wallet 200 may implement decentralized identifiers (DID), such as DID 220. DIDs are globally unique identifiers including a string of letters and numbers that serve as an identifying address on a distributed ledger. DIDs include a cryptographic private/public key pair. DID and self-sovereign identity may be implemented using a several different technical architectures. For example, as shown in the W3C's DIDs recommendation, a DID may be analogous to an HTTP uniform resource identifier (URI) because it is a human-readable string comprising a scheme, a method, and a method-specific identifier:

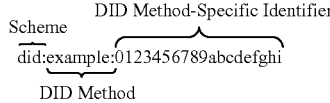

The above example DID string may resolve to an example DID document having the following definition:

```
{
  "@context": [
    "https://www.w3.org/ns/did/v1",
    "https://w3id.org/security/suites/ed25519-2020/v1"
  ]
  "id": "did:example:0123456789abcdefghi",
  "authentication": [{
      "id": "did:example:0123456789abcdefghi#keys-1",
      "type": "Ed25519VerificationKey2020",
      "controller": "did:example:0123456789abcdefghi",
      "publicKeyMultibase": "q8IM07A1curZi3hIh3Wp196MsGyB8r62"
  }]
}
```

The above exemplary DID string may be under the control of a user or organization, and independent from any centralized authority, database, or registry.

Figure 3:
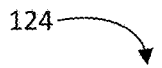
FIG. 3 illustrates a block diagram of computing applications and modules in accordance with an example aspect of the present disclosure.

FIG. 3 depicts exemplary application modules 124. The application modules 124 may include a smart hub application 310, authentication module 320, scraper module 330, chatbot module 340, distributed ledger manager module 350, zero knowledge proof (ZKP) module 360, oracle module 370, smart contract manager module 380, a machine learning (ML) module 390, and/or an account discovery module 396.

In one embodiment, the smart hub application 310 enables a user, who is operating client device 170, to view and/or manage one or more retirement accounts. The smart hub application 310 may be a web-based and/or client/server application. The smart hub application 310 may interface with one or more of the authentication module 320, scraper module 330, chatbot module 340, distributed ledger manager module 350, zero knowledge proof (ZKP) module 360, oracle module 370, smart contract manager module 380, a machine learning (ML) module 390, and/or an account discovery module 396 to view and/or manage one or more retirement accounts. The data for the one or more retirement accounts may be located in storage 130, at third-party financial institutions 160, and/or on the distributed ledger 128.

In one embodiment, the authentication module 320 authenticates users who attempt to access the smart hub application 310. The authentication module 320 may implement multi-factor authentication, including usernames, passwords, personal data, one-time codes, biometrics, cryptographically encrypted information, and/or any other suitable identifiers. In some aspects, the authentication module 320 implements one or more of the authentication techniques disclosed in U.S. patent application Ser. No. 18/404,128, which is titled "SECURED INTELLIGENT IDENTITY VERIFICATION THROUGH BLOCKCHAIN" and is incorporated by reference herein in its entirety. The authentication module 320 may store, e.g., in storage 130, authentication credentials for one or more retirement accounts at one or more third-party financial institutions 160. The authentication module 320 may use the stored authentication credentials to access account data for the one or more retirement accounts. The authentication module 320 may store one or more hashed account IDs corresponding to account data stored in the distributed ledger 128. The authentication module 320 may store one or more cryptographic keys associated with encrypted account data and/or transaction data stored in the distributed ledger 128.

In one embodiment, the scraper module 330 periodically, e.g., daily or weekly, retrieves text and/or data from one or more third-party financial institutions 160 and/or external data sources 180. Alternatively, the scraper module 330 may be executed manually, e.g., by a financial institution administrator and/or upon user login to the smart hub app 310. The retrieved text may include the text and/or data of third-party financial institution web pages, such as account statements and/or account policies. The scraper module 330 may save the retrieved text and/or data into the storage 130. The scraper module 330 may include a web scraping tool, such as Scrapy, Selenium, or Beautiful Soup. The scraper module 330 may include a program to retrieve the text and/or data via an application programming interface (API).

In one embodiment, one or more chatbot modules 340 are programmed to simulate human conversation, interact with users, understand their needs, generate content (e.g., a customized presentation), and/or recommend an appropriate line of action with minimal and/or no human intervention, among other things. This may include providing the best response of any query that it receives and/or asking follow-up questions.

In some embodiments, the chatbot modules 340 discussed herein may be configured to utilize AI and/or ML techniques. For instance, the chatbot module 340 may be a ChatGPT chatbot. The chatbot module 340 may employ supervised or unsupervised machine learning techniques, which may be followed by, or used in conjunction with, reinforced or reinforcement learning techniques. The chatbot module 340 may employ the techniques utilized for ChatGPT. The chatbot module 340 may deliver various types of output for user consumption in certain embodiments, such as a dialog output, text or textual output (such as presented on a computer or mobile device screen or display), visual or graphical output, and/or other types of outputs.

Noted above, in some embodiments, a chatbot module 340 or other computing device may be configured to implement ML, such that the financial institution server 110 "learns" to analyze, organize, and/or process data without being explicitly programmed. ML may be implemented through ML methods and algorithms. In one exemplary embodiment, the ML module 390 may be configured to implement the chatbot 340.

In one aspect, the chatbot module 340 includes one or more ML models trained to generate one or more types of content for a customized communication, such as text component, audio component, images/video, slides, virtual reality, augmented reality, mixed reality component, multimedia, blockchain, and/or metaverse content, as well as any other suitable content.

In one embodiment, the distributed ledger manager module 350 performs operations on the distributed ledger network. The distributed ledger manager module 350 may create new blocks and/or validate blocks in the distributed ledger 128. The distributed ledger manager module 350 may communicate with other nodes in the distributed ledger network via the network interface 114 and network 102.

In one embodiment, the ZKP module 360 executes one or more ZKPs, such as zero-knowledge Succinct Non-Interactive Arguments of Knowledge (zk-SNARKs) or Bulletproofs. ZKPs allow a prover (e.g., the financial institution server 110) to prove to another participant (e.g., the third-party financial institutions 160) that a certain statement is true over a private input without disclosing any other information from that input other than whether the statement is true or not. ZKPs allow the third-party financial institutions 160 to accept cryptographic proof that a financial account and/or financial transaction is compliant without revealing private financial data.

For example, the financial institution server 110 can prove the account or account holder data is within a particular range (e.g., the account holder's birthdate and/or Social Security Number is within a certain range, etc.) by obtaining a random seed and generating a signed proof statement using a hash chain along with encrypted user data. The financial institution server 110 then transmits the signed proof statement with the encrypted account and/or transaction data to prove that the account holder data is within the particular range.

The proof statement may be calculated by hashing the random seed (e.g., using a SHA-256 hashing algorithm) N times, where N is based on the difference between the minimum or maximum in the range and the actual value in the user data. For example, if the financial institution server 110 is proving that the distributions from the retirement account are at least 100% of the required minimum distribution (RMD), and the actual distributions are 106% of the RMD, the financial institution server 110 may hash the random seed six times to generate the proof and sign the proof with a cryptographic private key. The financial institution server 110 may also hash the random seed M times to generate encrypted user data, where M is based on the actual value in the user data. For example, the financial institution server 110 may hash the random seed 106 times. Then the financial institution server 110 sends the proof statement and the encrypted user data to the third-party financial institution 160. The third-party financial institution 160 verifies the cryptographic signature included in the proof statement. The third-party financial institution 160 also hashes the proof Z times, where Z is the minimum or maximum in the range. For example, the third-party financial institution 160 may hash the proof 100 times to generate a verification. Then the third-party financial institution 160 compares the verification to the encrypted user data. Because the account's actual distribution, M is Z+N, the encrypted user data generated by hashing the random seed M times should equal the verification generated by first hashing the random seed N times to generate the proof and then hashing the random seed Z times. Also, because a hash function is a one-way function, it cannot be undone to uncover the original seed and/or the actual distribution. If the verification and the encrypted user data are the same, the third-party financial institution 160 determines that the financial institution server 110 has proved that the account or account holder data is within the particular range.

This is one example of a ZKP for ease of illustration only. ZKPs may be generated in any suitable manner to cryptographically prove that the account and/or transaction has a particular attribute or satisfies a condition without revealing the account and/or transaction data.

In one aspect, the oracle module 370 provides external data to the distributed ledger 128. The oracle module 370 may collect information external to the distributed ledger 128, e.g., financial market data, and transmit that information to the distributed ledger 128 where it can be used in the regulatory compliance process.

In one aspect, the smart contract manager module 380 generates smart contracts for inclusion in the distributed ledger 128. The smart contract manager module 380 may compile programming code, such as Solidity or Vyper, into bytecode to be included in the distributed ledger 128. The smart contract manager module 380 may receive manually generated programming code and/or code that has been generated by an ML model.

In one aspect, the ML module 390 may include ML training module (MLTM) 392 and/or ML operation module (MLOM) 394. The ML module 390 may apply at least one of a plurality of ML methods and algorithms, which may include, but are not limited to: linear or logistic regression, autoregressive integrated moving average (ARIMA), instance-based algorithms, regularization algorithms, decision trees, isolation forests, Bayesian networks, cluster analysis, association rule learning, artificial neural networks, deep learning, combined learning, reinforced learning, dimensionality reduction, and support vector machines. In various embodiments, the implemented ML methods and algorithms may be directed toward at least one of a plurality of categorizations of ML, such as supervised learning, unsupervised learning, and reinforcement learning. In one aspect, the ML based algorithms may be included as a library or package executed on the financial institution server 110. For example, libraries may include the Tensor-Flow based library, the PyTorch library, the HuggingFace library, and/or the scikit-learn Python library.

In one embodiment, the ML module 390 employs supervised learning, which involves identifying patterns in existing data to make predictions about subsequently received data. Specifically, the ML module may be "trained" (e.g., via MLTM 392) using training data, which includes example inputs and associated example outputs. Based upon the training data, the ML module 390 may generate a predictive function which maps outputs to inputs and may utilize the predictive function to generate ML outputs based upon data inputs. In the exemplary embodiments, a processing element may be trained by providing it with a large sample of data with known characteristics or features.

In another embodiment, the ML module 390 employs unsupervised learning, which involves finding meaningful relationships in unorganized data. Unlike supervised learning, unsupervised learning does not involve user-initiated training based upon example inputs with associated outputs. Rather, in unsupervised learning, the ML module 390 may organize unlabeled data according to a relationship determined by at least one ML method/algorithm employed by the ML module 390.

In yet another embodiment, the ML module 390 employs reinforcement learning, which involves optimizing outputs based upon feedback from a reward signal. Specifically, the ML module 390 may receive a user-defined reward signal definition, receive a data input, utilize a decision-making model to generate the ML output based upon the data input, receive a reward signal based upon the reward signal definition and the ML output, and alter the decision-making model so as to receive a stronger reward signal for subsequently generated ML outputs. Other types of ML may also be employed, including deep or combined learning techniques.

The MLTM 392 may receive labeled data at an input layer of a model having a networked layer architecture (e.g., an artificial neural network, a convolutional neural network, etc.) for training the one or more ML models. The received data may be propagated through one or more connected deep layers of the ML model to establish weights of one or more nodes, or neurons, of the respective layers. Initially, the weights may be initialized to random values, and one or more suitable activation functions may be chosen for the training process. The present techniques may include training a respective output layer of the one or more ML models.

In operation, MLTM 392 may access storage 130 or any other data source for training data suitable to generate one or more ML models to generate the predictions, classifications, smart contract code, knowledge graphs, data visualization presentations, forecast reports, personalized impact assessment reports, e.g., ML models 126. The training data may be sample data with assigned relevant and comprehensive labels (classes or tags) used to fit the parameters (weights) of an ML model with the goal of training it by example. In one aspect, training data may include actual retirement contributions and/or withdrawals, investment selections, market performance, and/or retirement account balances for a plurality of individuals over time. In one aspect, once an appropriate ML model is trained and validated to provide accurate predictions and/or responses, e.g., the ML module 390, the trained model and/or chatbot 340 may be loaded into MLOM 394 at runtime, may process the inputs and/or prompts, and may generate as an output conversational dialog and/or a customized presentation.

The MLOM 394 may comprise a set of computer-executable instructions implementing ML loading, configuration, initialization, and/or operation functionality. The MLOM 394 may include instructions for storing trained models (e.g., in the storage 130).

While various embodiments, examples, and/or aspects disclosed herein may include training and generating one or more ML models and/or chatbot 340 for the financial institution server 110 to load at runtime, it is also contemplated that one or more appropriately trained ML models and/or chatbot 340 may already exist (e.g., in storage 130) such that the financial institution server 110 may load an existing trained ML model and/or chatbot 340 at runtime. It is further contemplated that the financial institution server 110 may retrain, update and/or otherwise alter an existing ML model and/or chatbot 340 before loading the model at runtime.

In one embodiment, the account discovery module 396 assists users in discovering and/or re-authenticating to one or more retirement accounts held by third-party financial institutions 160. Users may have one or more retirement accounts that they are unaware of. Users may also have one or more retirement accounts that they are aware of but no longer remember the authentication credentials, e.g., username and password, and are unable to use the username/password recovery features, e.g., phone number and/or e-mail address have changed. The user may request, via the smart hub app 310, discovery and/or reauthentication of retirement accounts. The user may provide identifying information, such as social security number, birth date, current and former names, DID 220, etc., or the account discovery module 396 may retrieve the identifying information from the storage 130. The account discovery module 396 may encrypt all or a portion of the identifying information with a private key associated with the financial institution server 110. The client device 170 may encrypt all or a portion of the identifying information with the private key 210A and transmit the encrypted identifying information to the account discovery module 396.

The account discovery module 396 may transmit the encrypted identifying information to one or more third-party financial institutions 160. The account discovery module 396 may, using ZKPs via the ZKP module 360, provide proof to the third-party financial institution 160 that numerical identifying information, e.g., social security number and/or birth date, falls within a specified range. The third-party financial institution 160 may decrypt the encrypted identifying information using a public key associated with the financial institution server 110 or the public key 210B. The third-party financial institution 160 may compare the decrypted identifying information or range provided by the ZKP to account data. If the third-party financial institution 160 finds a match with one or more accounts in its account data, the third-party financial institution 160 may send additional authentication requests, e.g., a telephone number to call, mother's maiden name, etc., to the user via the account discovery module 396. Once the user is authenticated by the third-party financial institution 160, the third-party financial institution may provide the account number and/or authentication credentials to the account discovery module 396 and/or client device 170.

FIG. 4 schematically illustrates how an ML environment 400 may train and/or operate a capture model 420 for receiving account and plan data and generating structured output and summaries. Some of the blocks in FIG. 4 represent hardware and/or software components (e.g., block 390), other blocks represent data structures or memory storing these data structures, registers, or state variables (e.g., block 410), some blocks represent input data (e.g., block 430), and other blocks represent output data (e.g., block 440). Input and output signals are represented by arrows.

An ML module, such as ML module 390, may include one or more hardware and/or software components, such as the MLTM 392 and MLOM 394, to obtain, create, (re)train, operate and/or save one or more ML models, such as the capture model 420. To generate an ML model, the MLTM 392 may use training data 410. New or updated training data 410 may be used to retrain or update the capture model 420.

As described herein, the server, such as financial institution server 110, may obtain and/or have available various types of training data 410 (e.g., stored in storage 130). In an aspect, the training data 410 may be labeled to aid in training, retraining and/or fine-tuning the capture model 420. The training data 410 may include example account data 412. The example account data 412 may include unstructured or structured text and data describing the investment holdings, account statements, balances, transaction histories, tax documents, and other financial records of a plurality of retirement accounts. The example account data 412 may be obtained from a financial institution associated with the financial institution server 110 or from one or more third party financial institutions 160.

The training data 410 may include example plan requirements 414. The example plan requirements 414 may include unstructured text describing government regulations and/or financial institution requirements for one or more retirement accounts, such as 401(k), 403(b), IRA, Roth, employer pension, and/or other account types. The example plan requirements 414 may be obtained from a financial institution associated with the financial institution server 110 or from one or more third party financial institutions 160.

The training data 410 may also include example summaries 416. The example summaries 416 may include examples of account data summaries, such as account data summary 444, and plan requirements summaries, such as plan requirements summary 446.

In one aspect, the training data 410 may include presentation style information 418 such as images, text, phonemes, audio, or other types of data which may be used as inputs as discussed herein for training the capture model 420 to generate different types of presentation components. The presentation style information 418 may include style information related to a particular style (e.g., fonts, logos, emblems, colors, etc.) an organization would like the customized presentation components to emulate. The presentation style information 418 may include investor profile information which may affect customizing the presentation for a particular user, e.g., the sophistication level of a particular retirement plan participant.

While the example training data includes indications of various types of training data 410, this is merely an example for ease of illustration only. The training data 410 may include any suitable data that may indicate associations between account data 430 and/or plan requirements 432 inputs and structured account data 440, structured plan requirements 442, account data summary 444, and/or plan requirements summary 446 outputs. The capture model 420 trained on such training data 410 will have an improved capability to generate the structured account data 440, structured plan requirements 442, account data summary 444, and/or plan requirements summary 446 when compared to a conventional ML chatbot.

In an aspect, the financial institution server 110 may continuously update the training data 410, e.g., based upon obtaining additional example account data 412, example plan requirements 414, example summaries 416, presentation style information 418, feedback or data collected from prior outputs, or any other training data. Subsequently, the capture model 420 may be retrained/fine-tuned based upon the updated training data 410. Accordingly, the generation of structured account data 440, structured plan requirements 442, account data summary 444, and/or plan requirements summary 446 may improve over time.

In an aspect, the MLTM 392 may process and/or analyze the training data 410 to train the capture model 420 to generate the structured account data 440, structured plan requirements 442, account data summary 444, and/or plan requirements summary 446. The capture model 420 may be trained to generate the structured account data 440, structured plan requirements 442, account data summary 444, and/or plan requirements summary 446 via a large language model (LLM), although any type of applicable ML model/algorithm may be used, including multimodal language models (e.g., text, audio, video, and/or image), small language models, and hybrid language models. Training may include using one or more of supervised learning, unsupervised learning, semi-supervised learning, and/or reinforcement learning.

In an aspect, the MLTM 392 may process and/or analyze the training data 410 to train the capture model 420 to generate structured account data 440. The structured account data 440 may include account holdings, balances, transactions, etc. in a structured format. The structured account data 440 may be in XML, JSON, or any other suitable format.

In an aspect, the MLTM 392 may process and/or analyze the training data 410 to train the capture model 420 to generate structured plan requirements 442. The structured plan requirements 442 may include financial institution requirements and/or applicable government regulations in a standardized format. The structured plan requirements 442 may be in XML, JSON, or any other suitable format.

In an aspect, the MLTM 392 may process and/or analyze the training data 410 to train the capture model 420 to generate an account data summary 444. The account data summary 444 may provide an analysis or summary of one or more retirement accounts across one or more financial institutions. The account data summary 444 may include total account holdings, total balances, total transactions, etc. across one or more retirement accounts. The account data summary 444 may be in PowerPoint, PDF, HTML, video, audio, or any other suitable format. The account data summary 444 may be formatted according to the specifications of the presentation style information 418.

In an aspect, the MLTM 392 may process and/or analyze the training data 410 to train the capture model 420 to generate a plan requirements summary 446. The plan requirements summary 446 may provide an analysis or summary of the requirements and/or regulations of one or more retirement accounts across one or more financial institutions. The plan requirements summary 446 may be in PowerPoint, PDF, HTML, video, audio, or any other suitable format. The account data summary 444 may be formatted according to the specifications of the presentation style information 418.

Once trained, the capture model 420 may perform operations on one or more data inputs to produce a desired data output. In one aspect, the capture model 420 may be loaded at runtime from a database (e.g., the storage 130) to process account data 430 and/or plan requirements 432 data input. The server, such as financial institution server 110, may obtain the account data 430 and/or plan requirements 432 and use it as an input to generate the structured account data 440, structured plan requirements 442, account data summary 444, and/or plan requirements summary 446. In one aspect, the server may obtain the account data 430 and/or plan requirements 432 via the scraper module 330, chatbot 340, oracle module 370, distributed ledger 128, third-party financial institutions 160, client device 170, and/or any other suitable source.

Generative AI/ML may enable a computer, such as the financial institution server 110, to use existing data (e.g., input and/or training data) such as text, audio, video, images, and/or code, among other things, to generate new content, such as structured account data 440, structured plan requirements 442, account data summary 444, and/or plan requirements summary 446 customized for an organization, via one or more models. Generative ML may include unsupervised and semi-supervised ML algorithms, which may automatically discover and learn patterns in input data. Once trained, e.g., via MLTM 392, a generative ML model may generate content as an output which plausibly may have been drawn from the original input dataset and may include the content in the customized presentation. In one aspect, an ML chatbot such as chatbot 340 may include one or more generative AI/ML models.

Some types of generative AI/ML may include GANs and/or transformer-based models. In one aspect, the GAN may generate images, visual and/or multimedia content from image and/or text input data. The GAN may include a generative model (generator) and discriminative model (discriminator). The generative model may produce an image which may be evaluated by the discriminative model and use the evaluation to improve operation of the generative model. Other types of generative AI/ML may use the GAN, the transformer model, and/or other types of models and/or algorithms to generate: (i) realistic images from sketches, which may include the sketch and object category as input to output a synthesized image; (ii) images from text, which may produce images (realistic, paintings, etc.) from textual description inputs; (iii) speech from text, which may use character or phoneme input sequences to produce speech/audio outputs; (iv) audio, which may convert audio signals to two-dimensional representations (spectrograms) which may be processed using algorithms to produced audio; and/or (v) video, which may generate and convert video (i.e., a series of images) using image processing techniques and may include predicting what the next frame in the sequence of frames/video may look like and generating the predicted frame. With the appropriate algorithms and/or training, generative AI/ML may produce various types of multimedia output and/or content which may be incorporated into a customized presentation, e.g., via an AI and/or ML chatbot (such as chatbot 340).

In one aspect, an enterprise may use the AI and/or ML chatbot, such as the trained chatbot 340, to generate one or more customized components of the account data summary 444 and/or plan requirements summary 446. The trained ML chatbot may generate output such as images, video, slides (e.g., a PowerPoint slide), virtual reality, augmented reality, mixed reality, multimedia, blockchain entries, metaverse content, or any other suitable components which may be used in the customized presentation.

Figure 5:
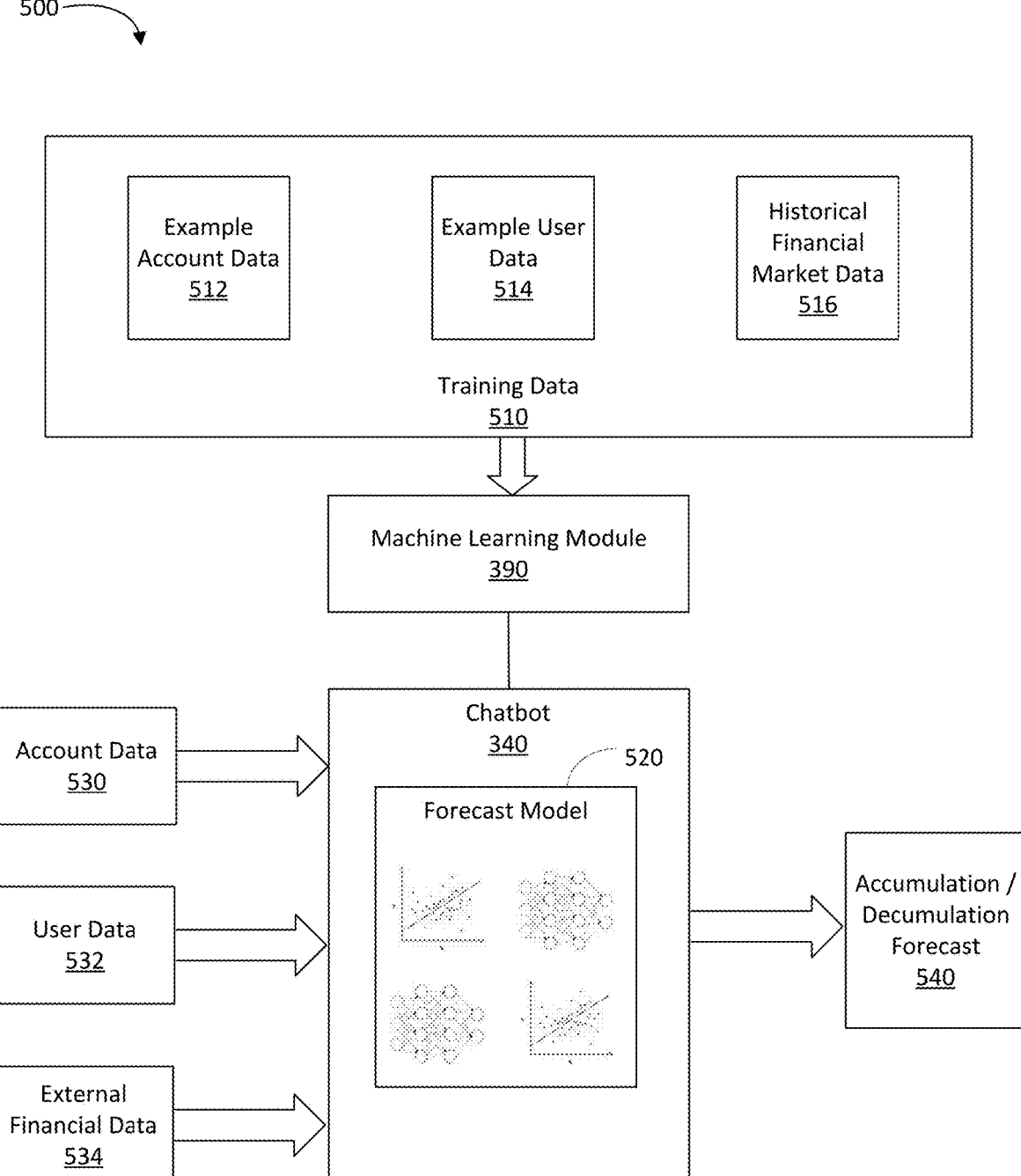

FIG. 5 schematically illustrates how an ML environment 500 may analyze account data and/or user data to forecast accumulation and/or decumulation of one or more retirement accounts.

As described herein, the server such as financial institution server 110 may obtain and/or have available various types of training data 510 (e.g., stored in storage 130). In an aspect, the training data 510 may labeled to aid in training, retraining, and/or fine-tuning the forecast model 520. The training data 510 may include example account data 512. The example account data 512 may include structured historical data from a plurality of retirement accounts. The example account data 512 may include data regarding investment holdings, contributions, withdrawals, and/or account balances over a time period.

The training data 510 may include example user data 514. The example user data 514 may include structured data regarding users associated with the example account data 512. The example account data 512 may include contribution history, income, and/or expenses associated with the users.

The training data 510 may include historical financial market data 516. The historical financial market data 516 may include structured data regarding a plurality of financial markets and/or assets. The historical financial market data 516 may include historical prices, growth rates, and/or volatility of financial markets and/or assets.

While the training data 510 includes indications of various types of training data, this is merely an example for ease of illustration only. The training data 510 may include any suitable data that may indicate associations between account data 530, user data 532, and/or external financial data 534 inputs and accumulation/decumulation forecast 540 output. The forecast model 520 trained on such training data 510 will have an improved capability to generate the accumulation/decumulation forecast 540 output when compared to a conventional ML chatbot or regression model.

In an aspect, the financial institution server 110 may continuously update the training data 510, e.g., based upon obtaining additional example account data 512, example user data 514, feedback or data collected from prior account analyses, or any other training data. Subsequently, the forecast model 520 may be retrained/fine-tuned based upon the updated training data 510. Accordingly, the generation of accumulation/decumulation forecasts 540 may improve over time.

In an aspect, the MLTM 392 may process and/or analyze the training data 510 to train the forecast model 520 to generate the accumulation/decumulation forecast 540. The forecast model 520 may be trained to generate the accumulation/decumulation forecast 540 via a neural network, deep learning model, Transformer-based model, generative pre-trained transformer (GPT), generative adversarial network (GAN), regression model, k-nearest neighbor algorithm, support vector regression algorithm, isolation forests, random forest algorithm, and/or Monte Carlo simulation, although any type of applicable ML model/algorithm may be used, including training using one or more of supervised learning, unsupervised learning, semi-supervised learning, and/or reinforcement learning.

In an aspect, the MLTM 392 may process and/or analyze the training data 510 to train the forecast model 520 to generate the accumulation/decumulation forecast 540. The accumulation/decumulation forecast 540 may predict the growth of one or more retirement accounts based upon contribution and investment growth assumptions. The accumulation/decumulation forecast 540 may predict the amount of income that the one or more retirement accounts can produce based upon account balance and user lifetime assumptions. The accumulation/decumulation forecast 540 may be in PowerPoint, PDF, HTML, video, audio, or any other suitable format.

Once trained, the forecast model 520 may perform operations on one or more data inputs to produce a desired data output. In one aspect, the forecast model 520 may be loaded at runtime from a database (e.g., the storage 130) to process the account data 530, user data 532, and/or external financial data 534 inputs. The server, such as financial institution server 110, may obtain the account data 530, user data 532, and/or external financial data 534 and use it as inputs to generate the accumulation/decumulation forecast 540. In one aspect, the server may obtain the account data 530, user data 532, and/or external financial data 534 via the scraper module 330, chatbot 340, oracle module 370, and/or any other suitable application or module. In one aspect, the server may obtain the account data 530, user data 532, and/or external financial data 534 via the third-party financial institutions 160, client device 170, external data sources 180, or any other suitable source.

In one embodiment, the forecast model 520 may use a regression model to determine an account balance prediction over time for the accumulation/decumulation forecast 540.

Once generated by the forecast model 520, the accumulation/decumulation forecast 540 may be provided to client device 170 or to another device. For example, the financial institution server 110 may provide the accumulation/decumulation forecast 540 via a mobile app, in an email, a website, via a chatbot (such as the chatbot 340), and/or in any other suitable manner.

FIG. 6 schematically illustrates how an ML environment 600 may train and/or operate a smart contract model 620 for receiving transaction, account, and plan requirements input data and generating smart contract code output.

As described herein, the server, such as financial institution server 110, may obtain and/or have available various types of training data 610 (e.g., stored in storage 130). In an aspect, the training data 610 may labeled to aid in training, retraining and/or fine-tuning the smart contract model 620. The training data 610 may include example transaction descriptions 612. The example transaction descriptions 612 may include unstructured or structured text and data describing financial transactions, e.g., rollovers, Roth IRA conversions, etc., for a plurality of retirement accounts. The example transaction descriptions 612 may be obtained from a financial institution associated with the financial institution server 110 or from one or more third party financial institutions 160.

The training data 610 may include example structured plan requirements 614. The example structured plan requirements 614 may include financial institution requirements and/or applicable government regulations in a standardized format. For example, the example structured plan requirements 614 may include annual contribution limits, required minimum distributions, etc.

The training data 610 may include example smart contract code 616. The example smart contract code 616 may include programming code, such as Solidity or Vyper, for performing one or more financial transactions on one or more retirement accounts. In some aspects, the example smart contract code 616 corresponds to the example transaction descriptions 612 and/or the example structured plan requirements 614.

While the example training data includes indications of various types of training data 610, this is merely an example for ease of illustration only. The training data 610 may include any suitable data that may indicate associations between transaction descriptions 630, account identifier 632, and/or structured plan requirements 634 inputs and smart contract code 640 outputs. The smart contract model 620 trained on such training data 610 will have an improved capability to generate the smart contract code 640 when compared to a conventional ML chatbot.

In an aspect, the financial institution server 110 may continuously update the training data 610, e.g., based upon obtaining additional example transaction descriptions 612, example structured plan requirements 614, example smart contract code 616, feedback or data collected from prior outputs, or any other training data. Subsequently, the smart contract model 620 may be retrained/fine-tuned based upon the updated training data 610. Accordingly, the generation of smart contract code 640 may improve over time.

In an aspect, the MLTM 392 may process and/or analyze the training data 610 to train the smart contract model 620 to generate the smart contract code 640. The smart contract model 620 may be trained to generate the smart contract code 640 via a large language model (LLM), although any type of applicable ML model/algorithm may be used, including multimodal language models (e.g., text, audio, video, and/or image), small language models, and hybrid language models. Training may include using one or more of supervised learning, unsupervised learning, semi-supervised learning, and/or reinforcement learning. The smart contract code 640 may include programming code, such as Solidity or Vyper, for performing one or more financial transactions on a retirement account.

Once trained, the smart contract model 620 may perform operations on one or more data inputs to produce a desired data output. In one aspect, the smart contract model 620 may be loaded at runtime from a database (e.g., the storage 130) to process transaction description 630, account identifier 632, and/or structured plan requirements 634 data inputs. The server, such as financial institution server 110, may obtain the transaction description 630, account identifier 632, and/or structured plan requirements 634 and use them as inputs to generate the smart contract code 640. In one aspect, the server may obtain the transaction description 630 via the chatbot 340, client device 170, and/or any other suitable source. In one aspect, the server may obtain the account identifier 632 from the distributed ledger 128, storage 130, third-party financial institutions 160, scraper module 330, and/or any other suitable source. In one aspect, the server may obtain the structured plan requirements 634 from the capture model 420, distributed ledger 128, storage 130, and/or any other suitable source.

Once generated by the smart contract model 620, the smart contract code 640 may be provided to the smart contract manager module 380 or to another device. The smart contract manager module 380 may cause a new smart contract comprising a bytecode version of the smart contract code 640 to be included in the blockchain.

Figure 7:
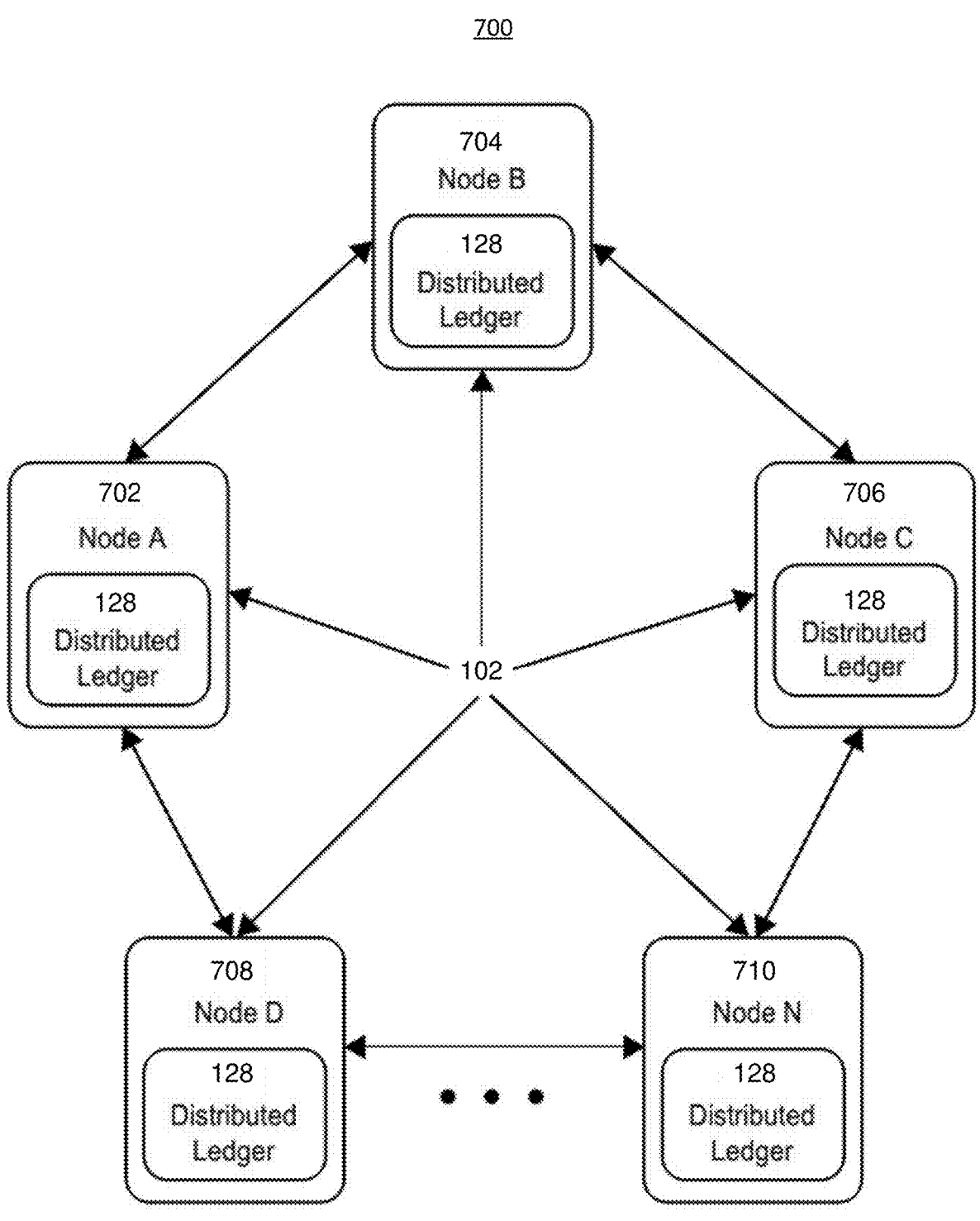
FIG. 7 illustrates an exemplary distributed ledger system for recording transactions and executing smart contracts in a decentralized file storage system in accordance with an example aspect of the present disclosure.

FIG. 7 depicts an exemplary distributed ledger system 700 for receiving and responding to requests to store user data. The system 700 includes the distributed ledger 128 and a plurality of nodes 702, 704, 706, 708, and 710, which may be storage centers, or may be any suitable computing devices, such as the financial institution server 110, validator nodes 150, and/or third-party financial institutions 160. Each node maintains a copy of the distributed ledger 128. As changes are made to the distributed ledger 128, each node receives the change via the network 102 and updates its respective copy of the distributed ledger 128. A consensus mechanism may be used by the nodes 702-710 in the distributed ledger system 700 to decide whether it is appropriate to make received changes to the distributed ledger 128.

Each node in the system therefore has its own copy of the distributed ledger 128, which is identical to every other copy of the distributed ledger 128 stored by the other nodes. The distributed ledger system 700 may be more robust than a central authority database system because of the distributed ledger's decentralized nature. As such, there is no single point of failure on the distributed ledger system 700 as there would be in a centralized system.

In one aspect, the distributed ledger system 700 is a private, permissioned system. Each of the nodes 702-710 may be operated by a financial institution. In one aspect, the distributed ledger system 700 is a public system or a system operated by an industry consortium. One or more nodes 702-710 may be operated by a third-party financial institution 160 or an anonymous member of the public.

FIG. 8 depicts exemplary validating network nodes and an exemplary transaction flow 800 on a distributed ledger network for resolving transactions. FIG. 8 includes two time frames 820 and 822 represented by the top and bottom sides of the dotted line, respectively, Node A 702 and Node B 704 (which may be two storage centers), a set of transactions 808A-808D, a set of blocks of transactions 809A-809D, the distributed ledger 128, and a blockchain 818.

The block propagation flow 800 may begin with Node A 702 receiving transaction 806 at timeframe 820. When Node A 702 confirms that transaction 806 is valid, Node A 702 may add the transaction to a newly generated block 808. As part of adding the transaction 806 to block 808, Node A 702 may provide proof of replication and/or proof of spacetime as proof that Node A 702 is storing a physically unique copy of original data and that the data is being stored continuously over time to generate the block 808. In other implementations, Node A 702 may solve a cryptographic puzzle and include the solution in the newly generated block 808 as proof of the work done to generate the block 808. Alternatively, a proof of stake algorithm may be used to generate the block 808, whereby Node A 702 "stakes" an amount of a digital token used on the network, however, the network itself determines the node that will mint the new block. In other embodiments, the transaction 806 may be added to a pool of transactions until a sufficient number of transactions in the pool exist to form a block. Node A 702 may transmit the newly created block 808 to the network at time 812. Before or after propagating the block 808, Node A 702 may add the block 808 to its copy of the blockchain 818.

While proof of replication, proof of spacetime, proof of work, and proof of stake are described herein as consensus algorithms for selecting a node to mint a new block; these are merely a few example consensus algorithms and are not intended to be limiting. Additional consensus algorithms may be utilized, such as delegated proof of stake where nodes elect a subset of nodes referred to as delegates to perform validation, and the delegates take turns minting new blocks. Consensus algorithms may also include proof of authority, proof of weight, Byzantine fault tolerance, tangle consensus algorithms, block lattice consensus algorithms, etc.

In any event, the transactions 809A-809D may include updates to a state database 816. The state database 816 may contain current values of variables created by smart contracts deployed on the blockchain 818. Validated blocks, such as block 808, may include transactions effecting state variables in state database 816. At timeframe 822, Node B 704 may receive the newly created block 808 via the network at time 812. Node B 704 may verify that the block of transactions 808 is valid by checking the proof of replication and/or proof of spacetime, or checking the solution to the cryptographic puzzle provided in the block 808. If the solution is accurate, then Node B 704 may add the block 808 to its blockchain 818 and make any updates to the state database 816 as rejected by the transactions in block 808. Node B 704 may then transmit the block 808 to the rest of the network at time 814.

In some embodiments, the blockchain includes several blocks connected together to form a chain of blocks of transactions. To cryptographically link blocks and transactions together, each block in the blockchain organizes its transactions into a Merkle Tree. In a Merkle Tree each transaction is hashed according to a cryptographic hashing algorithm (e.g., SHA-256), and the resulting output hash is then combined with the hash of another transaction. Then the combined result is also hashed according to the cryptographic hashing algorithm. This output is then combined with the hash of two other transactions, and this process is repeated until all of the transactions in the block are combined and hashed to generate a Merkle root that is used in the header for a block. If any single transaction in the block is tampered with, a different Merkle root would be generated since the Merkle root is a combination of the hashes of all the transactions in the block.

In other words, the transactions may be hashed using a cryptographic hash algorithm, such as the algorithms discussed above, and the hash of each transaction may be stored in the tree. As the tree is constructed, the hash of each adjacent node at the same level may be hashed together to create a new node that exists at a higher level in the tree. Therefore, the node at the top of the tree or Merkle root is dependent upon the hash of each transaction stored below in the tree. Each transaction may include a set of data. The set of data may include identifying data for the transaction, and transaction data identifying the nature of the transaction and what the transaction entails (e.g., input and output addresses, a transaction value, a document hash value, a timestamp, a transaction fee value, etc.).

To verify that a block is valid, a node may compare the Merkle root of the block to the Merkle root for the same block included in other nodes' copies of the blockchain. Thus, the Merkle root can be used as proof of the transactions included in the block and as proof that the contents of the block have not been tampered with if the Merkle root is the same in each node's copy of the block.

In one implementation, documents stored "on" a blockchain are documents that have been hashed according to a cryptographic hashing algorithm (e.g., SHA-256) and the resulting output hash has been included in a transaction in a block that has been accepted by the network nodes as satisfying the consensus rules of the blockchain. As such, the documents may be later verified or validated by comparing the hash of the documents to the hash stored on the blockchain. For example, if a set of documents results in a SHA-256 hash that was recorded on a blockchain on a certain date, then the blockchain provides cryptographic proof that the documents existed as of that date.

One way of storing a document on a blockchain is to broadcast a transaction including a hash of the document to the network, which will be included in a block if the transaction satisfies all of the consensus rules of the network. In some implementations, the blockchain is a permissioned ledger, meaning only authorized network participants may broadcast transactions. In other implementations, only some authorized network participants may make certain transactions. For example, user data may be uploaded to the blockchain as the encrypted user data is stored at a storage center. Only a cryptographic hash of the encrypted user data may be included in the blockchain, such that the encrypted user data may be verified using the blockchain even if it is obtained by a party off-chain.

Validating network nodes may verify that a signed transaction or signed message was signed by the private cryptographic key corresponding to the published public cryptographic key owned by the storage center storing the encrypted user data. In at least one implementation, a valid proof-of-identity may be applied as a consensus rule by the blockchain network. As such, any transaction attempting to store data without a cryptographic proof-of-identity matching an identity authorized to store data is rejected by the network as non-compliant with the consensus rule. Each storage center may be assigned a public key/private key pair which is identified in the blockchain network as corresponding to the storage center. If the validating network nodes receive a transaction including data storage information that is not from an authorized storage center, the validating network nodes reject the transaction.

In one aspect, the distributed ledger 128 may implement a privacy-enhanced protocol, e.g., MimbleWimble, that enables confidential transactions (CTs). CTs do not reveal the addresses of the sender or receiver or the number of tokens sent in the distributed ledger. CTs use the Pedersen Commitment scheme, in which the parties to a transaction share a "blinding key." The blinding key replaces the parties' addresses in the distributed ledger and encrypts the inputs and outputs of the transaction, thus enhancing privacy.

For example, Susan's digital wallet contains five tokens, and she wants to send two tokens to John. Susan generates a blinding key and combines it with a single hash after receiving John's address to create a confidential address. Although it is recorded in the distributed ledger, no one except Susan and John knows that the confidential address is associated with John's address. Then Susan creates a CT by generating a Pedersen Commitment with the blinding key and the output of two tokens. Thus, the amount that Susan sends John is hidden to other participants, but Susan and John can see the amount because they both have a public blinding key.

Pedersen Commitments solve the problem of validating whether the sum of encrypted transaction inputs is equal to the sum of the encrypted transaction outputs to ensure that no tokens were created or destroyed. Pedersen Commitments hash data and verify the data behind the hash using basic algebraic operations. For Susan's confidential transaction, Alice has the Pedersen Commitment of five tokens. When Susan sends John two tokens, Susan creates a hash using a mathematical formula. The same mathematical formula is then used to send two tokens to the exchange address. The two hashes are multiplied and compared to the Pedersen's Commitment of Susan's address; if the result is the same, the transaction is valid. To enable auditing, Susan or John can transfer the blinding key to a third party, such as the third-party financial institution 160, to reveal the transaction inputs and outputs.

Figure 9:
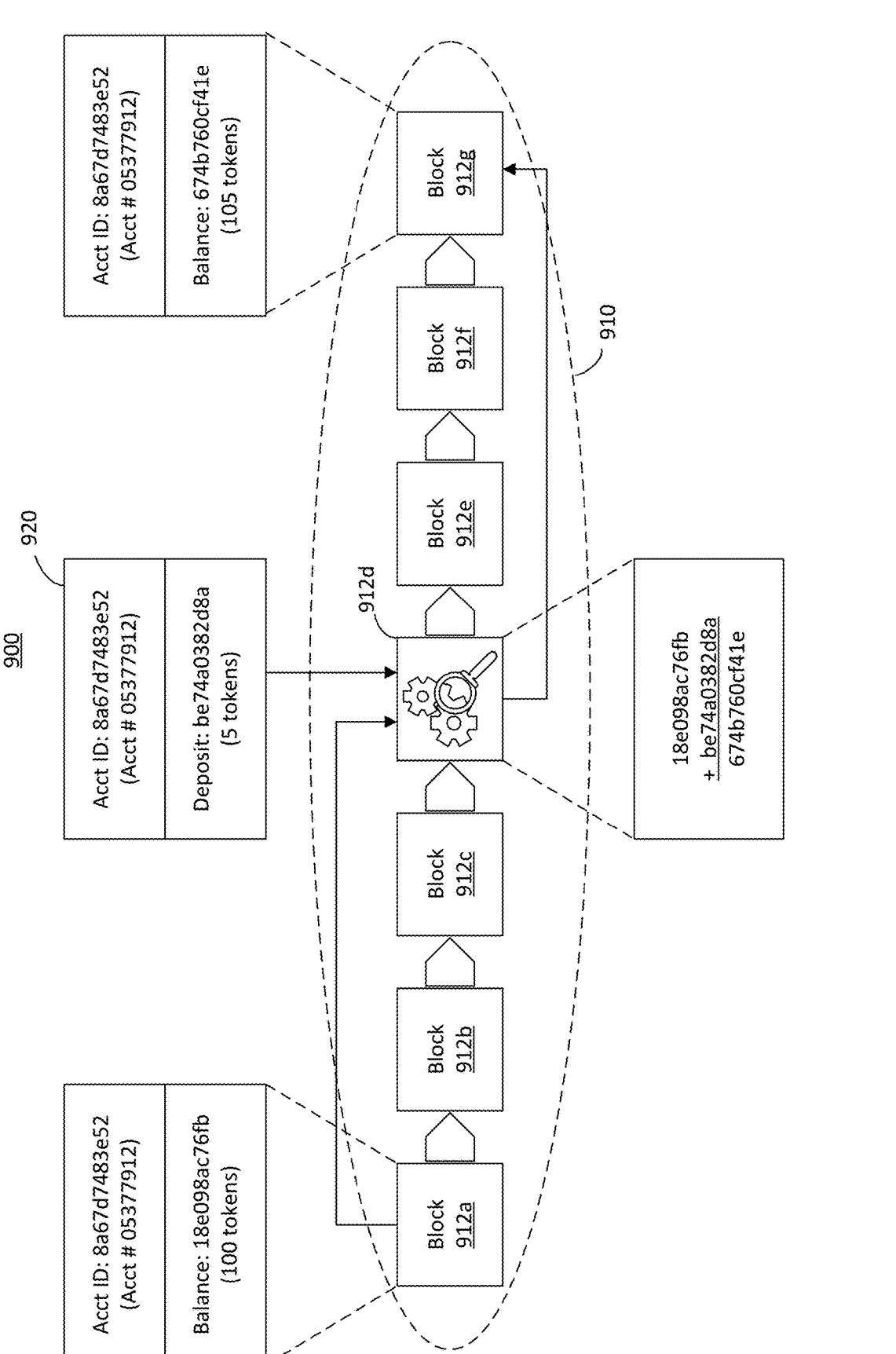
FIG. 9 illustrates an exemplary smart contract processing a transaction using fully homomorphic encryption in accordance with an example aspect of the present disclosure.

FIG. 9 depicts an exemplary environment 900 for implementing a fully homomorphic encryption (FHE) scheme, such as BGV, CKKS, BFV, FHEW, and TFHE, to enable privacy for blockchain transactions. FHE enables encrypted data processing such that smart contracts may perform computations on encrypted data input(s) to produce encrypted data output(s) without the need for decryption at any stage, thus ensuring data privacy during computation. FHE provides additive homomorphism, $Enc(m_1)+Enc(m_2)$ $=Enc(m_1+m_2)$, and multiplicative homomorphism, $Enc(m_1)$ $*Enc(m_2)=Enc(m_1*m_2)$.

In one aspect, the environment 900 includes a blockchain 910 comprising a plurality of blocks 912a-912g. Each block may be linked to the previous block by including a hash of the previous block.

In one aspect, block 912a includes financial account information, including the account ID and account balance. The account ID may be a hash of an account number at a financial institution. The account balance may be FHE encrypted using a shared secret key or an account holder public key to prevent other participants in the blockchain from viewing the plaintext balance.

In one aspect, some portion of the financial account information may be stored in a decentralized file storage system. The financial institution server 110 may store an encrypted version of the financial account information at an address derived from a content identifier (CID) in the decentralized file storage system. The CID may be the output of the financial account information being hashed according to a cryptographic hashing algorithm (e.g., SHA-256). In this manner, the CID uniquely corresponds to the financial account information, and if the financial account information is altered in any way the resulting hash will be different from the CID. The decentralized file storage system may include storage centers acting as nodes in a distributed ledger network.

In one aspect, the blockchain 910 includes a transaction smart contract 912*d*. The transaction smart contract 912*d* may include instructions for receiving one or more transaction inputs in plaintext and/or ciphertext, performing one or more financial transactions, and generating one or more transaction outputs in plaintext and/or ciphertext.

For example, an account holder may want to deposit five tokens into his or her account. After the financial institution receives the deposit request identifying the account number and deposit amount, the financial institution server 110 may generate a deposit transaction 920. The deposit transaction 920 may include the hashed account number that will receive the deposit and a deposit amount FHE encrypted by a shared secret key or an account holder public key. In one aspect, the financial institution server 110 transmits the deposit transaction 920 to the blockchain network and transmits the resulting block address and the address of block 912*a* to the transaction smart contract 912*d*. The transaction smart contract 912*d* may add the ciphertext account balance from block 912*a* to the ciphertext deposit amount from deposit transaction 920 to generate a ciphertext updated account balance. The transaction smart contract 912*d* may transmit the hashed account number and the ciphertext updated account balance to the blockchain network to cause the network to generate new block 912*g* including the hashed account number and the ciphertext updated account balance.

Figure 10:
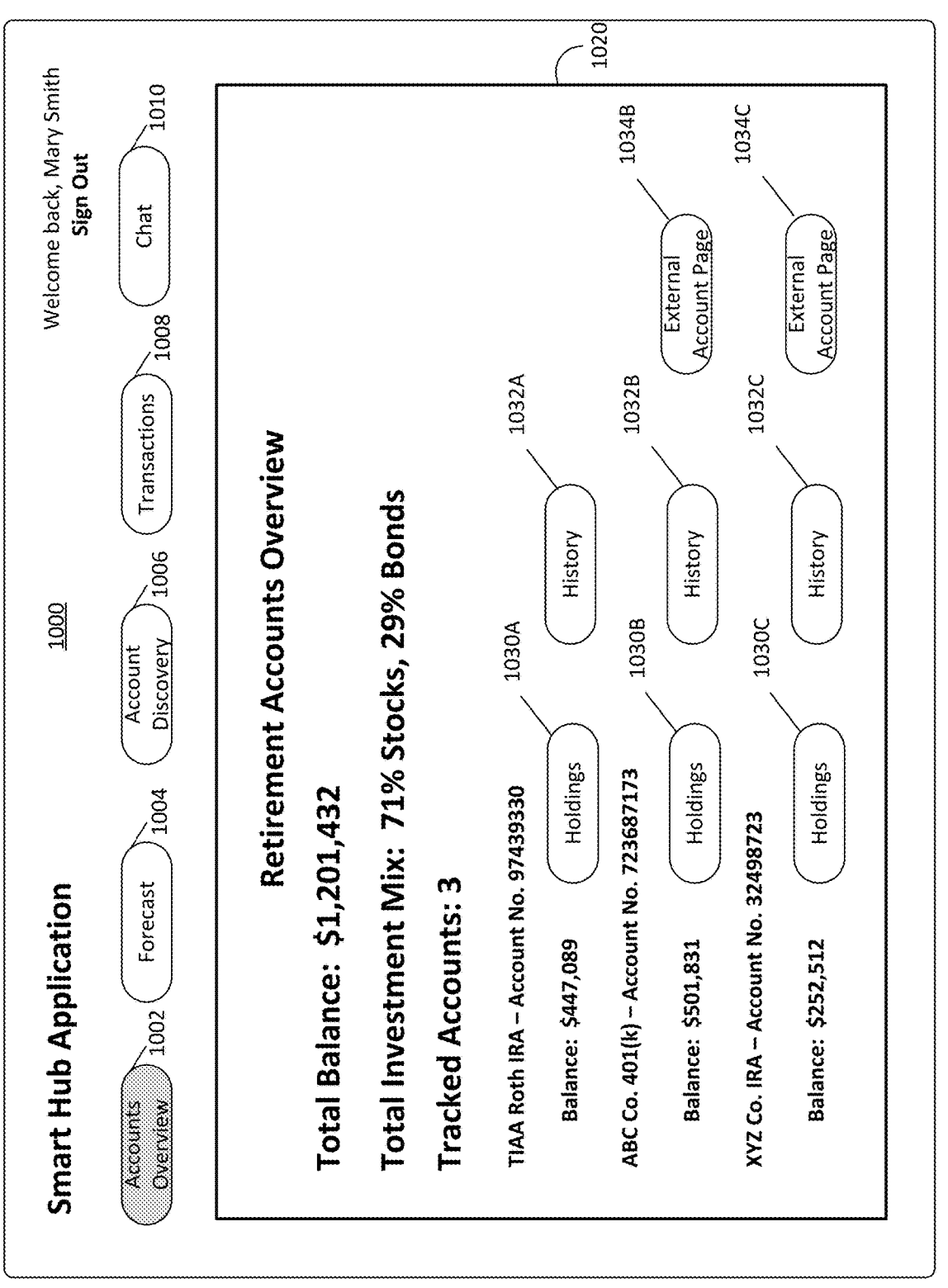

FIG. 10 depicts an exemplary user interface 1000 for the smart hub application 310. After the smart hub application 310 successfully authenticates the user, the user interface 1000 may be presented to the user via a web page or a dedicated application. The user interface 1000 may present user-selectable navigation options, such as accounts overview 1002, forecast 1004, account discovery 1006, transactions 1008, and/or chat 1010.

In one aspect, when the user selects accounts overview 1002, the user interface 1000 presents a retirement accounts overview window 1020. The retirement accounts overview window 1020 may present a summary of one or more retirement accounts at one or more financial institutions, including third-party financial institutions 160. The retirement accounts overview window 1020 may present information about each retirement account, such as the account balance. The retirement accounts overview window 1020 may provide options, such as holdings 1030A-1030C and history 1032A-1032C, to retrieve additional information about individual retirement accounts. The summary and/or additional information may be retrieved by the scraper module 330 and/or oracle module 370 from the third-party financial institutions 160, by the distributed ledger manager module 350 from the distributed ledger 128, and/or from the storage 130. The retirement accounts overview window 1020 may provide an external account page link 1034B and

1034C for accessing account management features at a web page of the third-party financial institution 160.

Figure 11A:
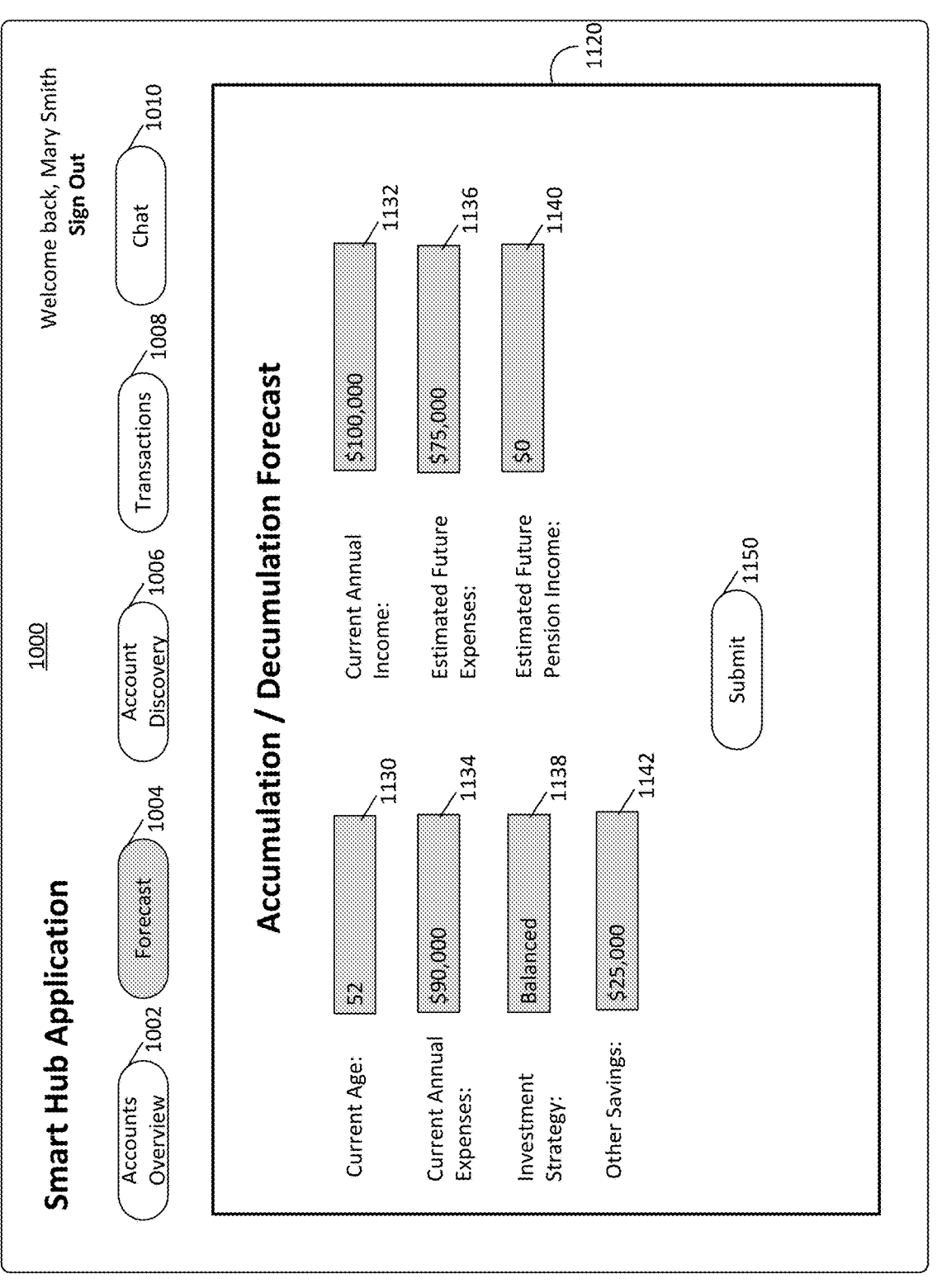
Figure 11B:
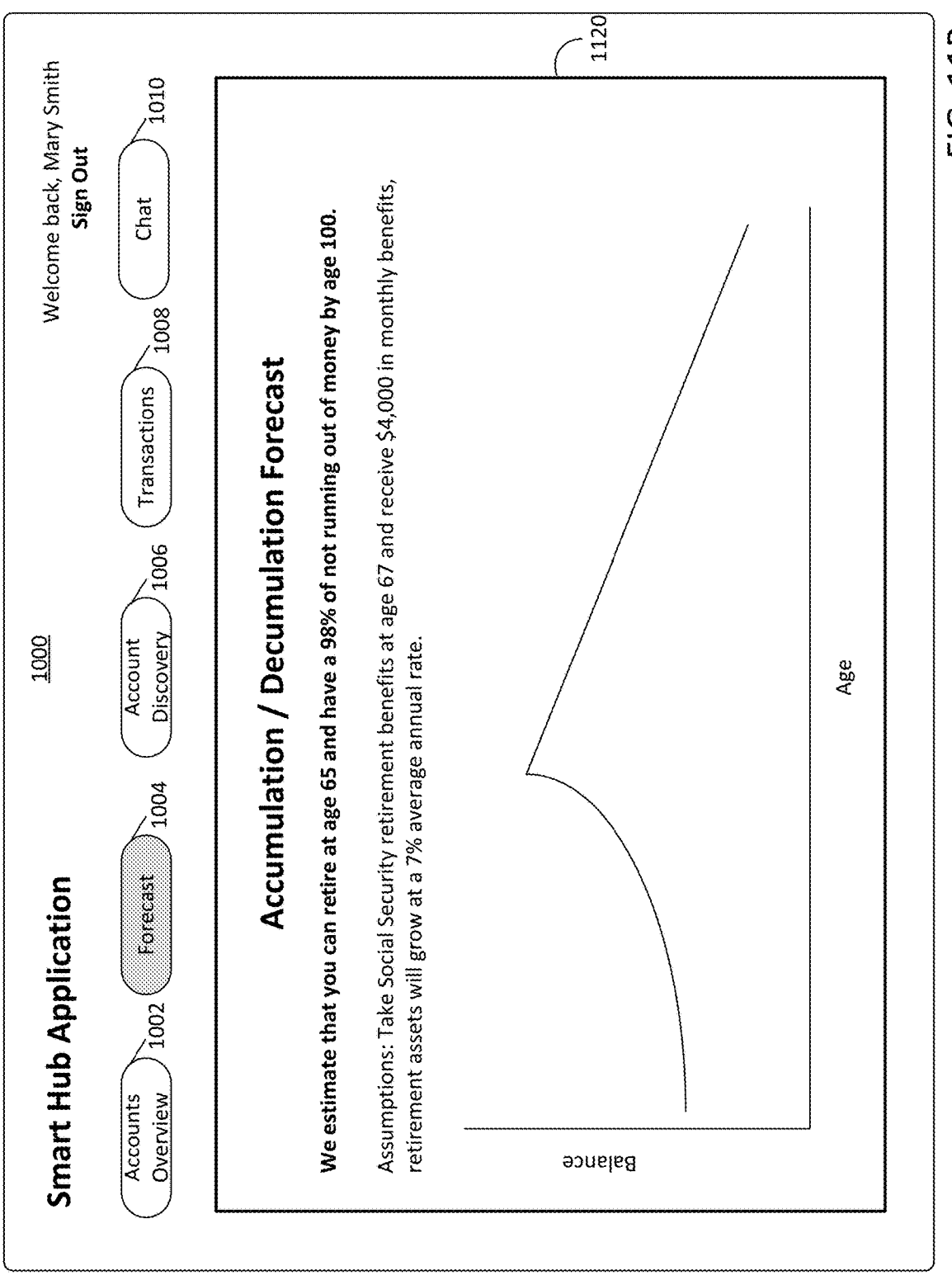

FIGS. 11A and 11B depict the user interface 1000 with the forecast option 1004 selected. When the user selects the forecast option 1004, the accumulation/decumulation forecast window 1120 of FIG. 11A is presented. The accumulation/decumulation forecast window 1120 may ask the user to enter or confirm personal information, such as current age 1130, current annual income 1132, current annual expenses 1134, estimate future expenses 1136, investment strategy 1138, estimated future pension income 1140, other savings 1142, and/or any other suitable information. When the user selects the submit button 1150, the accumulation/decumulation forecast window 1120 of FIG. 11B is presented. The accumulation/decumulation forecast window 1120 may present text narratives, numerical data, charts, and/or any other suitable information from the accumulation/decumulation forecast 540.

Figure 12:
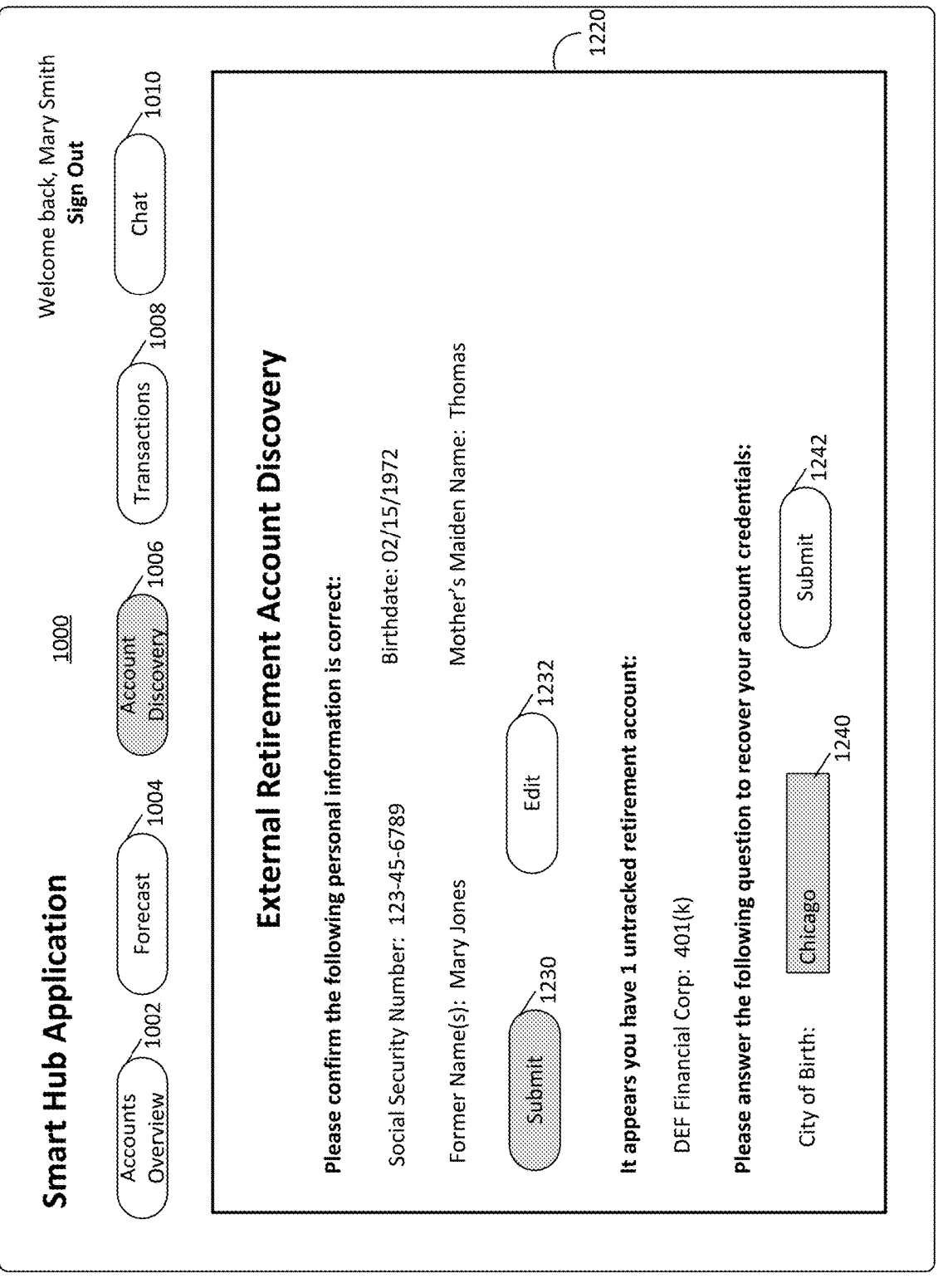

FIG. 12 depicts the user interface 1000 with the account discovery option 1006 selected. When the user selects the account discovery option 1006, the external retirement account discovery window 1220 is presented. The external retirement account discovery window 1220 may ask the user to enter or confirm personal information, such as Social Security number, birthdate, former name(s), and/or mother's maiden name. After the user clicks the submit button 1230, the account discovery module 396 may submit some or all of the personal information to a plurality of third-party financial institutions 160 to discover accounts potentially belonging to the user. If one or more accounts is found, the external retirement account discovery window 1220 may present information about the retirement account. The external retirement account discovery window 1220 may ask the user for additional personal information, e.g., city of birth 1240, requested by the third-party financial institution 160. After clicking the submit button 1242, the external retirement account discovery window 1220 may present information about the retirement account. The external retirement account discovery window 1220 may present a link or redirect the user to the third-party financial institution to recover or reset account credentials.

Figure 13:
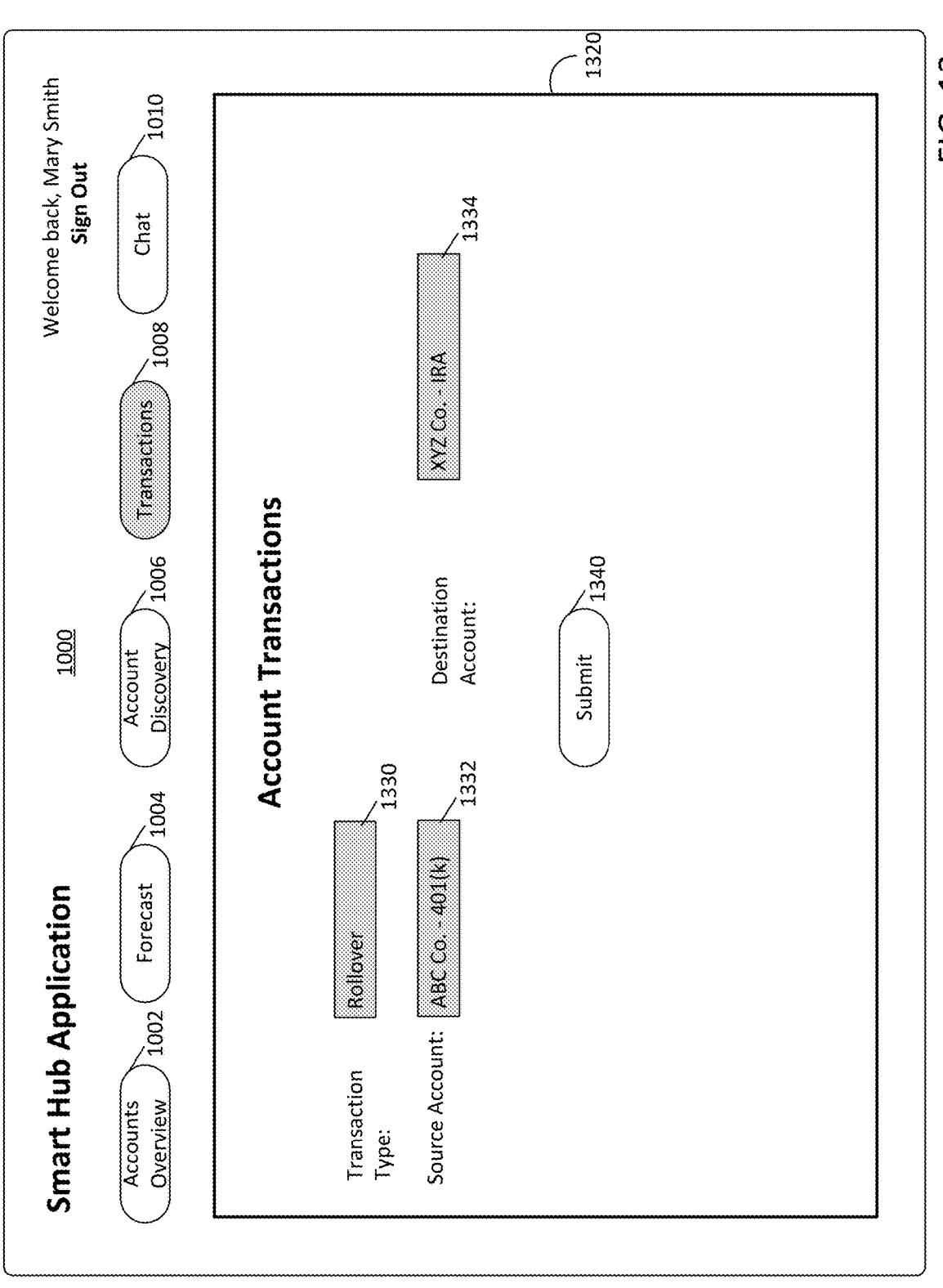

FIG. 13 depicts the user interface 1000 with the transactions option 1008 selected. When the user selects the transactions option 1008, the account transactions window 1320 is presented. The account transactions window 1320 may enable the user to perform one or more types of transactions affecting one or more retirement accounts. For example, in transaction type 1330, the user may select a predefined option, such as rollover, Roth conversion, etc. After selecting the transaction type 1330, the account transactions window 1320 may display a source account option 1332 and a destination account option 1334 from which the user can select retirement accounts. After the user selects the submit button 1340, the smart contract manager module 380 may generate a smart contract to implement the transaction, the smart hub application 310 may execute the transaction, and/or the smart hub application 310 may cause the transaction to be executed at one or more third-party financial institutions 160.

FIG. 14 depicts the user interface 1000 with the chat option 1010 selected. When the user selects the chat option 1010, the chat window 1420 is presented. The user can type and/or speak questions, requests, and other unstructured text input into the chat window 1420. The text input, plus user information and retirement account information, is sent to the chatbot module 340. The chatbot module 340 may present a response or execute requested commands in response to the user's text input.

Figure 15:
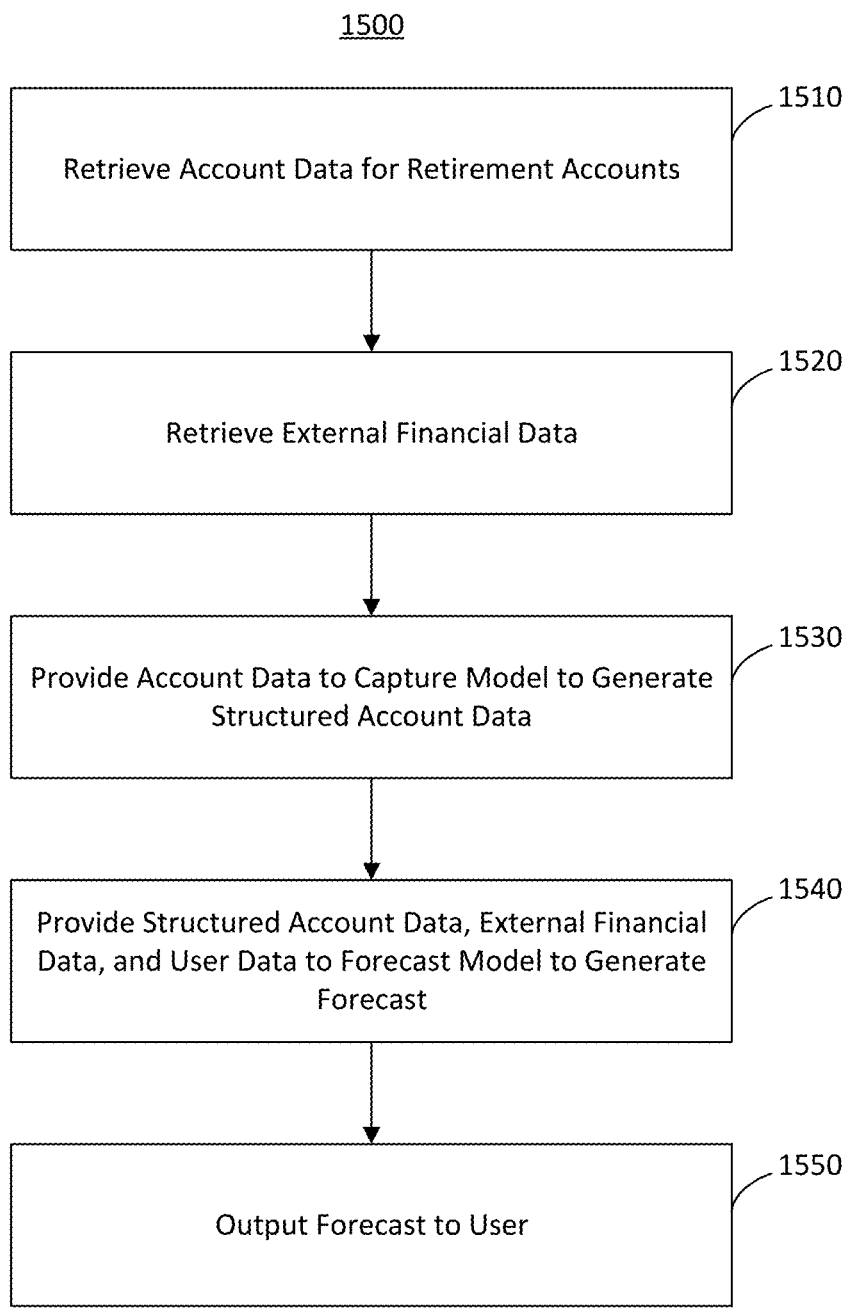
FIG. 15 illustrates a flow diagram representing an exemplary method for retirement account management in accordance with an example aspect of the present disclosure.

FIG. 15 depicts a flow diagram of an example computer-implemented method 1500 for managing one or more retirement accounts for a user. The method 1500 may operate as a stand-alone method, and/or may operate in conjunction with embodiments of at least a portion of the retirement account management computing system 100 and of any one or more components and/or devices related thereto, and/or with other systems, processors, databases and/or devices. For example, the financial institution server 110 may execute at least a portion of the method 1500. In some embodiments, the financial institution server 110 may execute at least a portion of the method 1500 in conjunction with one or more other components of the retirement account management computing system 100, such as the validator nodes 150, third-party financial institutions 160, client device 170, and/or external data sources 180. Further, the method 1500 may include additional or alternate steps other than those described with respect to FIG. 15 in embodiments.

In one embodiment, the method 1500 may include receiving a DID, such as DID 220. The DID may include identification information associated with the user. The DID may be encrypted by a private key, such as private key 210A, associated with the user. The DID may be received and/or processed by the authentication module 320 and/or any other suitable module or application. The method 1500 may include decrypting the DID using a public key, such as public key 210B, associated with the user. The method 1500 may include verifying that the DID includes information associated with the user.

In one embodiment, the method 1500 may include at block 1510 retrieving account data for one or more retirement accounts. The account data may be retrieved from the distributed ledger 128, storage 130, and/or one or more third-party financial institutions 160. The account data may include account identifiers, transactions, holdings, current values, historical values, etc. Retrieving the account data may include authenticating to the one or more third-party financial institutions using third-party authentication credentials. Authentication may include submitting the third-party authentication credentials via a web form, an application, an API, etc. The third-party authentication credentials may include the user's usernames, passwords, etc. for the third-party financial institutions 160. The third-party authentication credentials may be saved in storage 130. The third-party authentication credentials may be received from the user. Retrieving the account data may include scraping the account data from a web page or an application of the third-party financial institutions 160. Retrieving the account data may include retrieving encrypted account data from a distributed ledger, such as distributed ledger 128. Retrieving the account data may include decrypting the encrypted account data using a cryptographic key associated with the user. The cryptographic key may be a secret key shared by the financial institution server 110 and the client device 170. The authentication module 320, smart hub application 310, scraper module 330, the distributed ledger manager module 350, and/or any other suitable application or module may retrieve the account data.

In one embodiment, the method 1500 may include at block 1520 retrieving external financial data from one or more external data sources. The external data sources may include third-party financial institutions 160, external data sources 180, and/or any other suitable source. The external financial data may include prices, price-to-earnings ratios, dividend yields, etc. of one or more financial assets. The scraper module 330, oracle module 370, and/or any other suitable application or module may retrieve the external financial data.

In one embodiment, the method 1500 may include at block 1530 providing the account data to a trained capture model, such as capture model 420, to cause the trained capture model to generate structured account data and/or an account summary. The account summary may include information about the one or more retirement accounts. The machine learning module 390, MLOM 394, and/or any other suitable application or module may provide the account data.

In one embodiment, the method 1500 may include at block 1540 providing the structured account data, the external financial data, and/or user data associated with the user to a trained deep learning forecast model, such as forecast model 520, to cause the trained deep learning forecast model to generate a forecast, such as accumulation/decumulation forecast 540. The forecast may include a prediction of a total balance of the one or more retirement accounts over time. The forecast may include an estimate of accumulation and decumulation rates of the one or more retirement accounts. The machine learning module 390, MLOM 394, and/or any other suitable application or module may provide the structured account data, the external financial data, and/or user data.

In one embodiment, the method 1500 may include at block 1550 outputting the forecast and/or the account summary to the user. The forecast and/or account summary may be presented by the smart hub application 310, chatbot module 340, and/or any other suitable application or module. The forecast and/or account summary may be transmitted to the client device 170 via a web browser, application, e-mail, and/or any other suitable method.

In one embodiment, the method 1500 may include receiving by a chatbot, such as chatbot 340, a question from the user regarding the forecast and/or account summary. The chatbot may generate and output an answer to the question. The method 1500 may include receiving by the chatbot feedback from the user regarding the forecast and/or account summary. The trained deep learning forecast model may be tuned using the feedback. The machine learning module 390, MLTM 392, and/or any other suitable application or module may perform the tuning.

Figure 16A:
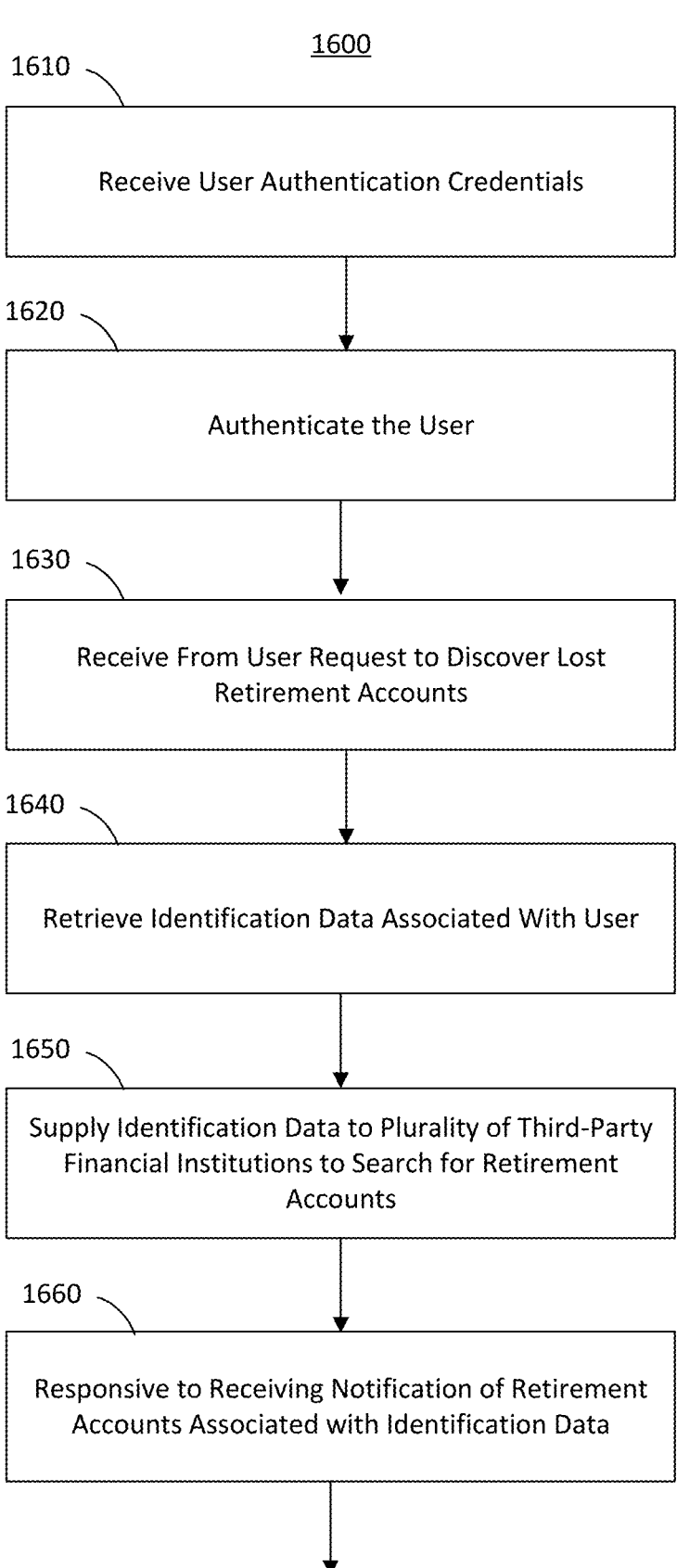
FIGS. 16A and 16B illustrate a flow diagram representing an exemplary method for discovering lost retirement accounts in accordance with an example aspect of the present disclosure.
Figure 16B:
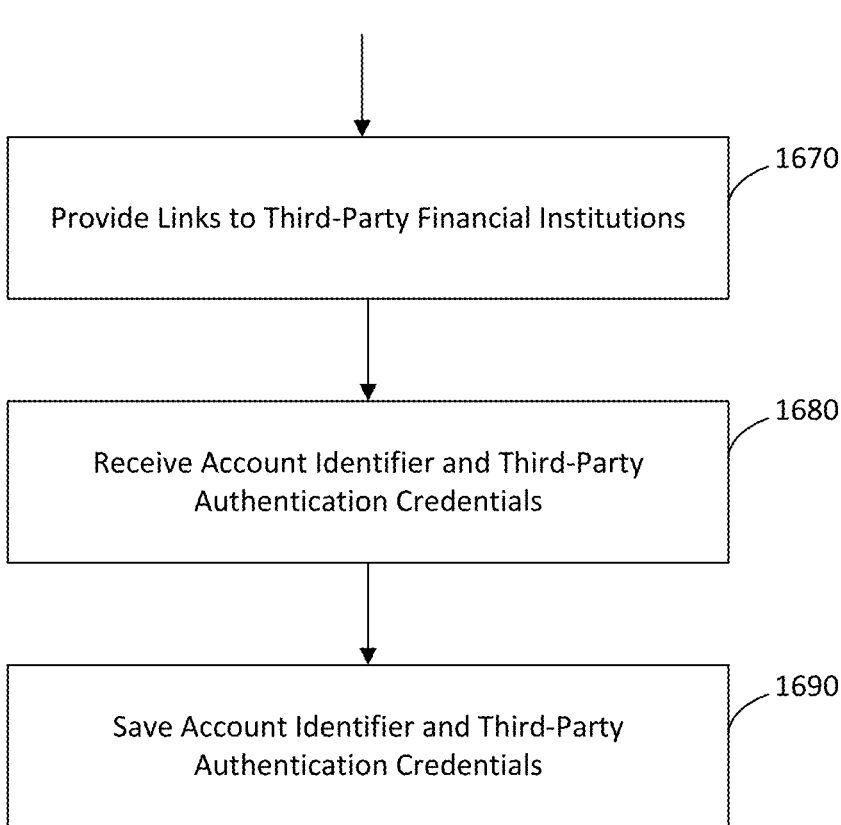

FIGS. 16A and 16B depict a flow diagram of an example computer-implemented method 1600 for discovering lost retirement accounts for a user. The method 1600 may operate as a stand-alone method, and/or may operate in conjunction with embodiments of at least a portion of the retirement account management computing system 100 and of any one or more components and/or devices related thereto, and/or with other systems, processors, databases and/or devices. For example, the financial institution server 110 may execute at least a portion of the method 1600. In some embodiments, the financial institution server 110 may execute at least a portion of the method 1600 in conjunction with one or more other components of the retirement account management computing system 100, such as the validator nodes 150, third-party financial institutions 160, client device 170, and/or external data sources 180. Further, the method 1600 may include additional or alternate steps other than those described with respect to FIGS. 16A and 16B in embodiments.

In one embodiment, the method 1600 may include at block 1610 receiving user authentication credentials. The user authentication credentials may include the user's username, password, one-time password, DID, etc. for accessing the smart hub application 310. The user authentication credentials may be encrypted by a private key, such as private key 210A, associated with the user.

In one embodiment, the method 1600 may include at block 1620 authenticating the user. Authenticating the user may include decrypting the user authentication credentials with a public key, such as public key 210B, associated with the user. The authentication module 320 and/or any other suitable module or application may authenticate the user.

In one embodiment, the method 1600 may include at block 1630 receiving from the user a request to discover lost retirement accounts. The lost retirement accounts may include retirement accounts that the user is presently unaware of and/or retirement accounts for which the user lacks authentication credentials and account recovery information. The request may be received by the smart hub application 310, chatbot 340, account discovery module 396, and/or any other suitable module or application.

In one embodiment, the method 1600 may include at block 1640 retrieving identification data associated with the user. The identification data may be provided by the user or may be retrieved from storage 130. The identification data may be received by the smart hub application 310, chatbot 340, account discovery module 396, and/or any other suitable module or application.

In one embodiment, the method 1600 may include at block 1650 supplying the identification data to a plurality of third-party financial institutions, such as third-party financial institutions 160. The identification data may be encrypted, e.g., using a private key shared between the financial institution server 110 and the third-party financial institution, before being supplied to the third-party financial institutions. The identification data may be supplied over an encrypted connection, such as HTTPS. Proof of the identification data may be provided by a ZKP. The identification data may be supplied by the ZKP module 360, account discovery module 396 and/or any other suitable module or application. Supplying the identification data may cause the plurality of third-party financial institutions to search for retirement accounts associated with the identification data.

In one embodiment, the method 1600 may include at block 1660 receiving notification of one or more retirement accounts associated with the identification data. In response to receiving the notification, the method 1600 may include performing one or more of blocks 1670-1690.

In one embodiment, the method 1600 may include at block 1670 providing one or more links to one or more of the plurality of third-party financial institutions associated with the one or more retirement accounts. The provided links may enable the user to reset third-party authentication credentials for logging into the third-party financial institutions. The links may be provided by the smart hub application 310, chatbot 340, and/or any other suitable application or module.

In one embodiment, the method 1600 may include at block 1680 receiving an account identifier and third-party authentication credentials for the one or more retirement accounts. The account identifier and third-party authentication credentials may be received from the user or the third-party financial institutions. The links may be provided by the smart hub application 310, chatbot 340, account discovery module 396, and/or any other suitable application or module.

In one embodiment, the method 1600 may include receiving from the user third-party authentication credentials and a third-party financial institution identifier for one or more known retirement accounts. The credentials and identifier may be received by the smart hub application 310, the chatbot 340, and/or any other suitable application or module.

In one embodiment, the method 1600 may include at block 1690 saving the account identifier and the third-party authentication credentials. The account identifier and the third-party authentication credentials may be saved into storage 130. The account identifier and the third-party authentication credentials may be saved by the authentication module 320, the account discovery module 396, and/or any other suitable application or module.

In one embodiment, the method 1600 may include retrieving encrypted account data associated with the one or more retirement accounts. The encrypted account data may be retrieved from a distributed ledger, such as distributed ledger 128, using the account identifier. The encrypted data may be decrypted using a cryptographic key associated with the user. The distributed ledger manager module 350 and/or any other suitable application or module may retrieve and decrypt the data.

In one embodiment, the method 1600 may include authenticating to the one or more third-party financial institutions using the third-party authentication credentials. The method 1600 may include scraping account data associated with the one or more retirement accounts from an application or a web page of the one or more third-party financial institutions. The authentication module 320, scraper module 330, oracle module 370, and/or other suitable application or module may authenticate to the third-party financial institutions and scrape the account data.

Figure 17B:
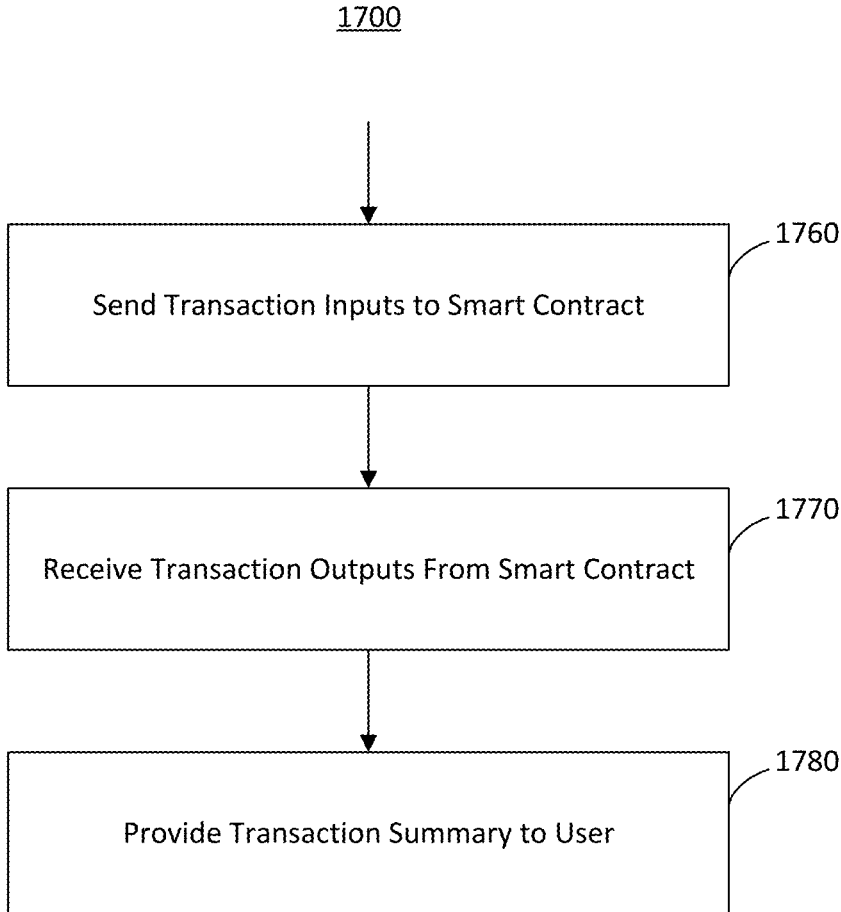

FIGS. 17A and 17B depict a flow diagram of an example computer-implemented method 1700 for performing retirement account transactions on a distributed ledger. The method 1700 may operate as a stand-alone method, and/or may operate in conjunction with embodiments of at least a portion of the retirement account management computing system 100 and of any one or more components and/or devices related thereto, and/or with other systems, processors, databases and/or devices. For example, the financial institution server 110 may execute at least a portion of the method 1700. In some embodiments, the financial institution server 110 may execute at least a portion of the method 1700 in conjunction with one or more other components of the retirement account management computing system 100, such as the validator nodes 150, third-party financial institutions 160, client device 170, and/or external data sources 180. Further, the method 1700 may include additional or alternate steps other than those described with respect to FIGS. 17A and 17B in embodiments.

In one embodiment, the method 1700 may include receiving a DID, such as DID 220. The DID may include identification information associated with the user. The DID may be encrypted by a private key, such as private key 210A, associated with the user. The DID may be received and/or processed by the authentication module 320 and/or any other suitable module or application. The method 1700 may include decrypting the DID using a public key, such as public key 210B, associated with the user. The method 1700 may include verifying that the DID includes information associated with the user.

In one embodiment, the method 1700 may include at block 1710 receiving a transaction request from a user. The transaction request may include a transaction description, e.g., 401(k) rollover, Roth IRA conversion, etc., and one or more retirement account identifiers associated with one or more retirement accounts. The transaction request may be received by the smart hub application 310, chatbot 340, and/or any other suitable application or module.

In one embodiment, the method 1700 may include at block 1720 retrieving plan requirements associated with the one or more retirement accounts. The plan requirements may include financial institution rules and/or government regulations. The plan requirements may be retrieved from storage 130, third-party financial institutions 160, external data sources 180, and/or any other suitable source. The scraper module 330, oracle module 370, and/or any other suitable application or module may retrieve the plan requirements.

In one embodiment, the method 1700 may include at block 1730 providing the transaction description, retirement account identifier(s), and/or the plan requirements to a trained smart contract model, such as smart contract model 620, to cause the smart contract model to generate smart contract code, such as smart contract code 640. The smart contract code may include programmatic logic for executing the transaction request. The machine learning module 390, MLOM 394, and/or any other suitable application or module may provide the transaction description, retirement account identifier(s), and/or the plan requirements.

In one embodiment, the method 1700 may include providing the plan requirements to the chatbot to generate a plan requirements summary. The plan requirements summary may include condensed text providing an overview of the plan requirements.

In one embodiment, the method 1700 may include at block 1740 compiling the smart contract code into a smart contract. The smart contract may include executable bytecode. The smart contract may be configured to receive one or more transaction inputs associated with the transaction request, execute the transaction request using the one or more transaction inputs, and/or generate one or more transaction outputs. The smart contract may be configured to execute the transaction request on encrypted transaction inputs and generate encrypted transaction outputs using FHE. The smart contract may be compiled by the smart contract manager module 380 and/or any other suitable application or module.

In one embodiment, the method 1700 may include at block 1750 transmitting the smart contract to at least one other participant in a distributed ledger network, such as distributed ledger system 700, to deploy the smart contract. The smart contract may be stored in a distributed ledger, such as distributed ledger 128, maintained by a network of participants. The smart contract may be transmitted by the distributed ledger manager module 350, smart contract manager module 380, and/or any other suitable application or module.

In one embodiment, the method 1700 may include at block 1760 sending one or more transaction inputs to the smart contract. For example, the transaction inputs may include currency amounts to transfer between accounts. One or more of the transaction inputs may be encrypted. The smart contract manager module 380 and/or any other suitable application or module may send the transaction inputs.

In one embodiment, the method 1700 may include at block 1770 receiving one or more transaction outputs from the smart contract. For example, the transaction outputs may include a transaction confirmation and/or updated account balances. One or more of the transaction outputs may be encrypted. The encrypted transaction outputs may be decrypted using a cryptographic key associated with the user. The cryptographic key may be a private key shared between the financial institution server 110 and the client device 170. The smart contract manager module 380 and/or any other suitable application or module may receive the transaction outputs.

In one embodiment, the method 1700 may include at block 1780 providing a transaction summary and/or the plan requirements summary to the user. The transaction summary may include information about the one or more transaction inputs and/or the one or more transaction outputs. The transaction summary may be provided by the smart hub application 310, chatbot module 340, and/or any other suitable application or module. The transaction summary may be transmitted to the client device 170 via a web browser, application, e-mail, and/or any other suitable method.

In one embodiment, the method 1700 may include receiving by a chatbot, such as chatbot 340, a question from the user regarding the transaction summary. The chatbot may generate and output an answer to the question. The method 1700 may include receiving by the chatbot feedback from the user regarding the transaction summary. The method 1700 may include tuning the trained smart contract model using the feedback. The machine learning module 390, MLTM 392, and/or any other suitable application or module may perform the tuning.

This detailed description is to be construed as exemplary only and does not describe every possible embodiment, as describing every possible embodiment would be impractical, if not impossible. One may implement numerous alternate embodiments, using either current technology or technology developed after the filing date of this application.

Although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a processor configured using software, the processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a business or home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A computer-implemented method for managing one or more retirement accounts for a user, the method comprising:

retrieving, by one or more processors, account data for the one or more retirement accounts associated with one or more third-party financial institutions, wherein retrieving the account data comprises:

authenticating, by the one or more processors, to the one or more third-party financial institutions using third-party authentication credentials, transmitted via a secure virtual private network (VPN) tunnel employing symmetric encryption and exchanged keys, and scraping, by a web scraping application, the account data from an application or a web page of the one or more third-party financial institutions and processing, by the one or more processors, the account data into a structured format, and retrieving, by the one or more processors, encrypted account data from a distributed ledger and decrypting the encrypted account data using a cryptographic key associated with the user;

retrieving, by the one or more processors, external financial data from one or more external data sources;

inputting, by the one or more processors, the account data into a trained capture model to and executing the trained capture model to generate structured account data;

inputting, by the one or more processors, the structured account data, the external financial data, and user data associated with the user into a trained deep learning forecast model and executing the trained deep learning forecast model to generate a forecast, wherein the forecast comprises a prediction of a total balance of the one or more retirement accounts over time;

fine-tuning, by the one or more processors, the trained deep learning forecast mode, and the trained capture model responsive to detecting updated training data including one or more of updated account data, updated external financial data, or updated user data to improve the forecast over time by;

labeling, by the one or more processors, the updated training data for the trained deep learning forecast model and the trained deep learning forecast model;

analyzing, by the one or more processors using a machine learning training software, the updated training data;

retraining, by the one or more processors using the machine learning training software, the trained capture model and the trained deep learning forecast model using the labeled updated training data to improve the forecast; and outputting, by the one or more processors, the improved forecast to the user.

2. The computer-implemented method of claim 1, further comprising:

receiving, by the one or more processors, a decentralized identification (DID) encrypted by a private key associated with the user;

decrypting, by the one or more processors, the DID using a public key associated with the user; and verifying, by the one or more processors, that the DID comprises identification information associated with the user.

3. The computer-implemented method of claim 1, wherein the third-party authentication credentials are retrieved from a data storage.

4. The computer-implemented method of claim 1, wherein the third-party authentication credentials are received from the user.

5. The computer-implemented method of claim 1, wherein providing the account data to the trained capture model further causes the trained capture model to generate an account data summary comprising information about the one or more retirement accounts, and wherein outputting the forecast further comprises outputting, by the one or more processors, the account data summary to the user.

6. The computer-implemented method of claim 1, further comprising:

receiving, by a chatbot executed by the one or more processors, a question from the user regarding the forecast; and outputting, by the chatbot executed by the one or more processors, an answer to the question.

7. The computer-implemented method of claim 1, further comprising:

receiving, by a chatbot executed by the one or more processors, feedback from the user regarding the forecast; and tuning, by the one or more processors, the trained deep learning forecast model using the feedback.

* * * * *